(12) United States Patent
Trettin et al.

(10) Patent No.: US 7,316,527 B2
(45) Date of Patent: Jan. 8, 2008

(54) LOCKSET DRILLING GUIDE

(75) Inventors: David J. Trettin, Atlanta, GA (US);
Richard M. Davidian, Weddington, NC (US); Laverne R. Durfee, Harmony, NC (US); Kristofor M. Hallee, San Francisco, CA (US); Jonathan S. Holz, Huntersville, NC (US); Robert McRorie, Huntersville, NC (US); Jacob W. Connelly, Concord, NC (US)

(73) Assignee: Irwin Industrial Tool Company, Freeport, IL (US)

( * ) Notice: Subject to any disclaimer, the term of this patent is extended or adjusted under 35 U.S.C. 154(b) by 580 days.

(21) Appl. No.: 10/835,806

(22) Filed: Apr. 29, 2004

(65) Prior Publication Data
US 2004/0240950 A1    Dec. 2, 2004

Related U.S. Application Data

(63) Continuation-in-part of application No. 10/629,959, filed on Jul. 30, 2003, now Pat. No. 6,910,837.

(60) Provisional application No. 60/556,437, filed on Mar. 24, 2004, provisional application No. 60/407,485, filed on Aug. 30, 2002.

(51) Int. Cl.
*B23B 47/28* (2006.01)
(52) U.S. Cl. .................................. 408/1 R; 408/115 R
(58) Field of Classification Search ............... 408/3, 408/72 R, 72 B, 97, 103, 115 R, 241 B, 1 R; 33/644, 194
See application file for complete search history.

(56) References Cited

U.S. PATENT DOCUMENTS

| 917,488 | A | | 4/1909 | Roberts |
|---|---|---|---|---|
| 993,597 | A | | 5/1911 | Harvat |
| 1,210,942 | A | | 1/1917 | Jones |
| 1,919,900 | A | * | 7/1933 | Moller ......................... 408/95 |
| 2,033,072 | A | | 3/1936 | Harp |
| 2,268,930 | A | | 1/1942 | Edwards |

(Continued)

FOREIGN PATENT DOCUMENTS

GB          2092488 A       8/1982

(Continued)

OTHER PUBLICATIONS

Canadian Examiner's Office Action Report for corresponding Canadian Application No. 2,438,416 dated Aug. 19, 2005.

*Primary Examiner*—Daniel W. Howell
(74) *Attorney, Agent, or Firm*—Moore & Van Allen PLLC; Dennis J. Williamson

(57) ABSTRACT

A lockset drilling guide that comprises a frame is provided. The frame comprises a first flange and a second flange. The second flange is capable of flexing relative to the first flange. The lockset drilling guide further comprises at least a first opening and a second opening defined in the frame. The first opening is positioned at approximately 90 degrees relative to the second opening. A positioning member is mounted on the frame, wherein the positioning member is laterally movable to at least two positions relative to the frame. The frame is configured for mounting on a door to facilitate the forming of holes in the door for the installation of a lockset.

39 Claims, 16 Drawing Sheets

U.S. PATENT DOCUMENTS

| | | | |
|---|---|---|---|
| 2,798,520 A | 7/1957 | Maskulka et al. | |
| 2,838,966 A | 6/1958 | Campbell | |
| 3,008,359 A | 11/1961 | Mackey | |
| 3,021,734 A * | 2/1962 | Schlage | 408/31 |
| 3,212,366 A | 10/1965 | Russell et al. | |
| 3,293,954 A * | 12/1966 | Russell et al. | 408/97 |
| 3,338,277 A * | 8/1967 | Axel et al. | 144/27 |
| 3,635,571 A * | 1/1972 | Roberts et al. | 408/97 |
| 4,248,554 A | 2/1981 | Boucher et al. | |
| 4,280,776 A | 7/1981 | Chaconas et al. | |
| 4,306,823 A | 12/1981 | Nashlund | |
| 4,331,411 A | 5/1982 | Kessinger et al. | |
| 4,715,125 A | 12/1987 | Livick | |
| 4,813,826 A | 3/1989 | Riedel | |
| 5,114,285 A | 5/1992 | Brydon | |
| 5,222,845 A | 6/1993 | Goldstein et al. | |
| 5,407,307 A | 4/1995 | Park | |
| 5,569,001 A | 10/1996 | Brutscher et al. | |
| 5,573,352 A | 11/1996 | Matadobra | |
| 5,762,115 A | 6/1998 | Shouse | |
| 5,791,834 A | 8/1998 | Zehrung | |
| 5,915,891 A | 6/1999 | Fridman | |
| 6,186,708 B1 | 2/2001 | Fridman | |
| 6,193,449 B1 | 2/2001 | Diaz | |
| 6,343,632 B1 | 2/2002 | Zivojinovic | |
| 6,390,738 B1 | 5/2002 | Fridman | |
| 6,398,465 B1 | 6/2002 | Monge | |
| 6,659,695 B2 | 12/2003 | Park | |
| 7,003,889 B1 * | 2/2006 | Luciani | 33/194 |
| 7,073,991 B2 * | 7/2006 | Thomas | 408/115 R |
| 2006/0104730 A1 * | 5/2006 | Valdez | 408/3 |

FOREIGN PATENT DOCUMENTS

| | | |
|---|---|---|
| GB | 2219763 | 12/1989 |
| GB | 2229391 | 9/1990 |

* cited by examiner

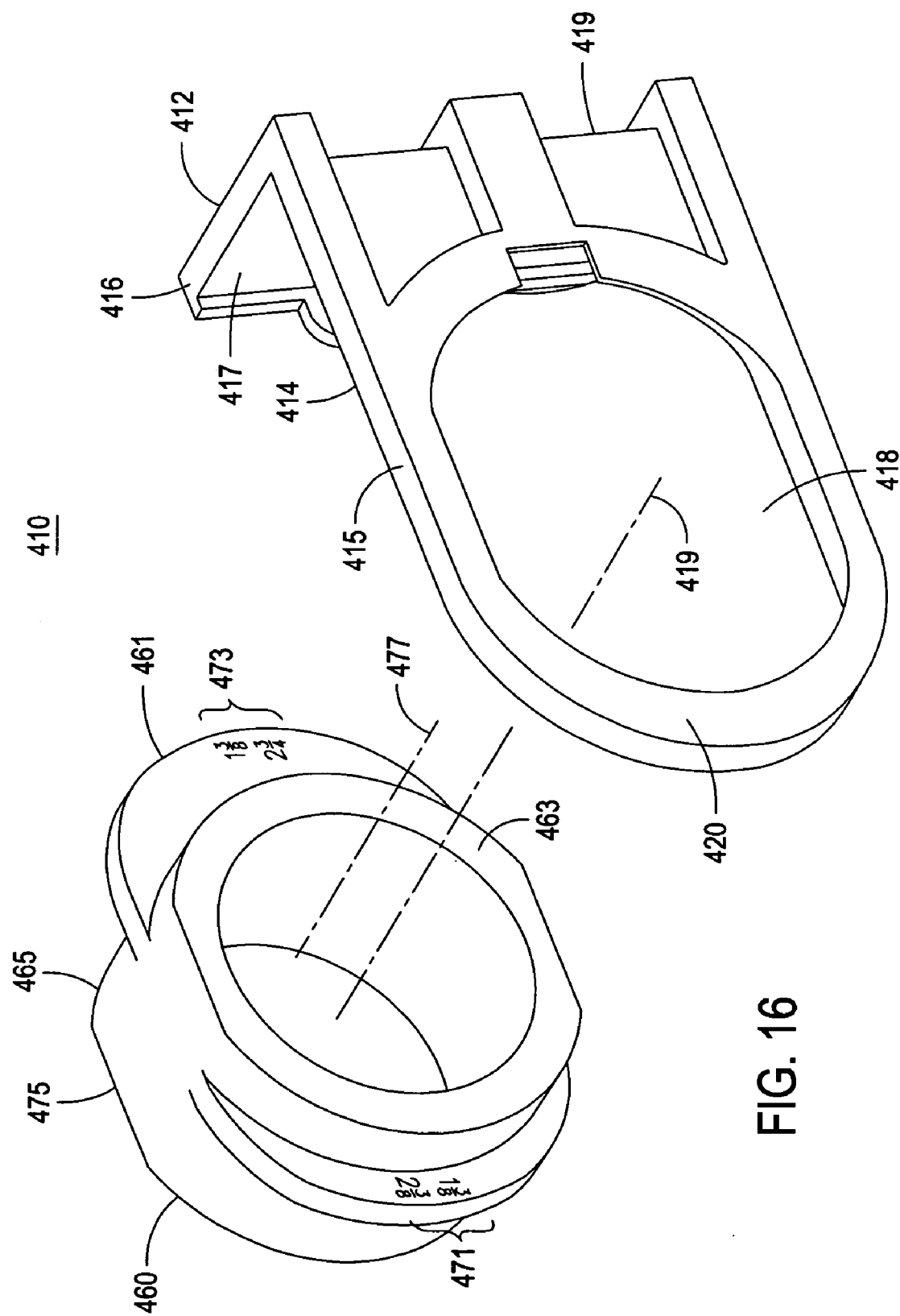

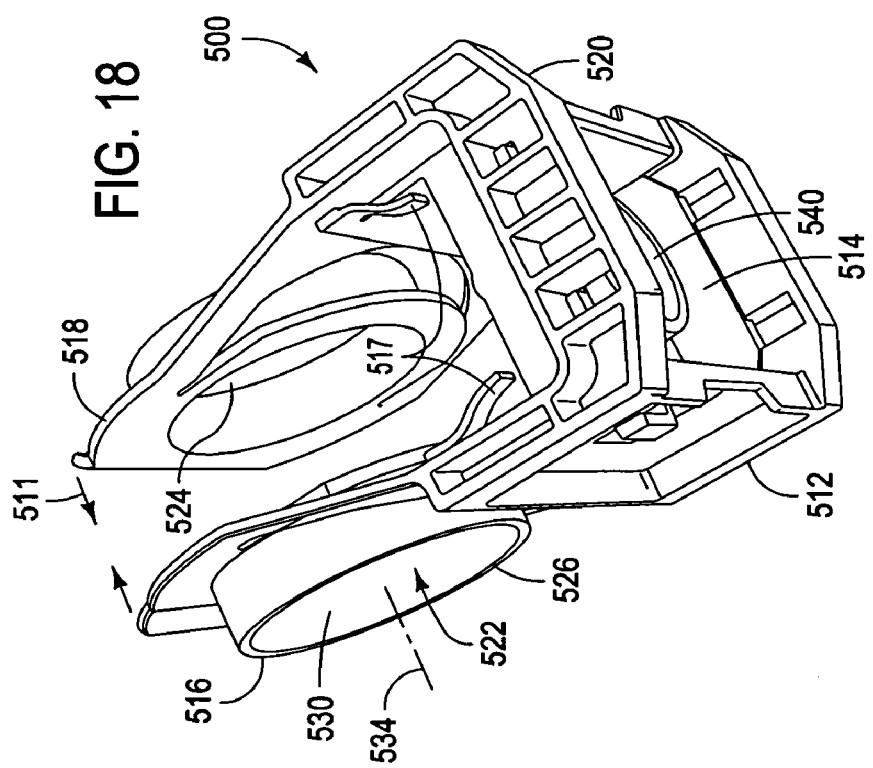
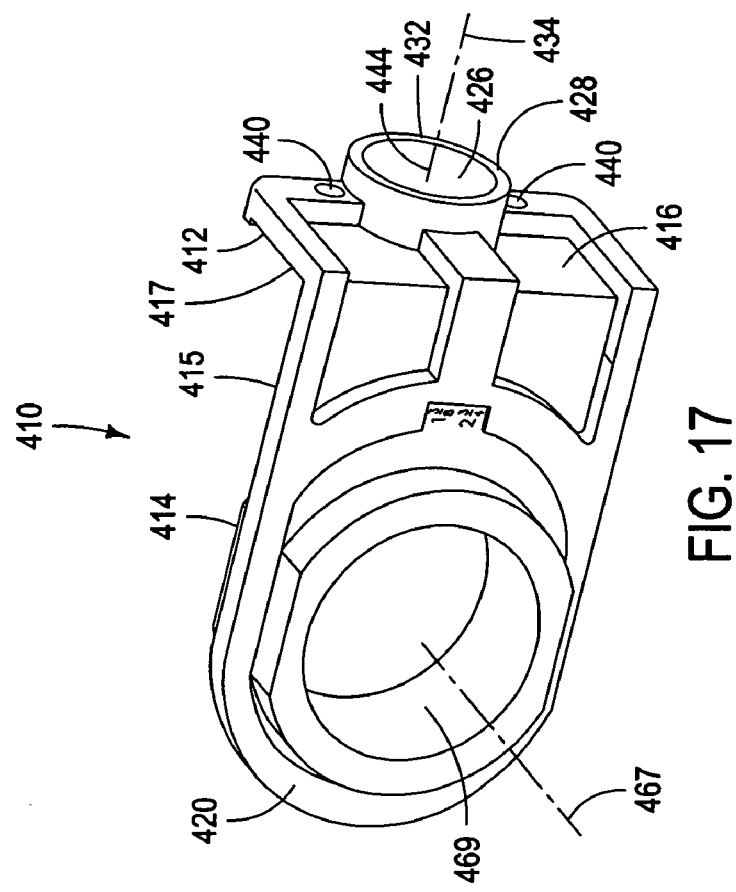

LOCKSET DRILLING GUIDE

This application is a continuation-in-part of U.S. application Ser. No. 10/629,959, filed Jul. 30, 2003 now U.S. Pat. No. 6,910,837 which claims priority to U.S. Provisional Application No. 60/407,485, filed Aug. 30, 2002, which are incorporated in their entirety herein. This application claims the benefit of U.S. Provisional Application No. 60/556,437, filed Mar. 24, 2004, which is incorporated in its entirety herein.

FIELD OF THE INVENTION

The present invention relates to carpentry tools. In particular, the present invention relates to a drilling guide for facilitating the drilling of holes in a door for the installation of standard locksets.

BACKGROUND

Standard-sized door handle locksets are used to latch and secure hinged doors to a doorjamb-mounted strikeplate. These locksets typically require the drilling of a large, through-going hole in the face of the door and a perpendicularly extending, smaller hole in the edge of the door. Additional holes must be drilled in the edge of the door to retain the latchplate. The lockset and door handles are mounted to both sides of the larger hole, and the latchplate and cylinder latch are mounted to the smaller hole on the edge of the door.

Typically, the center of the larger hole, which is located in the face of the door, must be either 2⅜ or 2¾ inches from the edge of the door, depending on the type or brand of lockset to be installed. To facilitate the drilling of the holes in the door, most of such locksets include a paper template that the installer may affix to the door to mark the drilling holes for the lockset.

These paper templates have significant shortcomings, however. First, the non-durable templates must be taped to the door, and this may become a tedious task for carpenters who are charged with installing many locksets at a jobsite. Furthermore, because of the stretching of the template or the possibility of misaligning it on the door with the wrong marking line, it is very possible that one or more of the holes may be marked in the wrong location. The fact that interior doors typically are configured in at least two popular thicknesses (1⅜ inches and 1¾ inches) adds to the difficulty in accurately positioning the template. In addition to these problems with the template, it is often difficult to drill holes in the door edge and face that are perfectly aligned with their central axes perpendicular to each other. Such misalignment or misplacement may result in a poorly fitting lockset or a lockset that fails to properly engage the strikeplate on the door jamb. At worst, an entire door can be ruined and may need to be completely discarded if the holes are drilled improperly.

A particularly inexperienced user may even use the wrong size holesaw or paddle bit when using either of these template methods, thereby resulting in a large hole of an incorrect size. If the hole is too small for the lockset yet too large for the pilot drill of a holesaw, it may be impossible for the proper-sized holesaw to enlarge the hole accurately on center of the previous hole. A similar problem will arise when enlarging a preexisting lockset hole in a previously drilled door, in that it is extremely difficult to center the larger holesaw over the center of a preexisting hole. Because newer locksets typically require a 2⅛-inch hole in the face of the door instead of the previously popular 1⅞-inch hole, this has become an increasing problem.

In the past, some have attempted to solve some of the inaccuracy problems in lockset installation through the use of a more durable plastic template that allows the drilling of pilot holes in the door. Such a template is shown in U.S. Pat. No. 4,280,776. While the plastic template disclosed therein may have some advantages over a paper template, the tool is still prone to most of the inaccuracy problems discussed above. Furthermore, by only allowing the marking or drilling of pilot holes, additional time-consuming steps must be taken in preparing and drilling each door.

BRIEF SUMMARY OF THE INVENTION

In order to address one or more of the shortcomings discussed above, a lockset drilling guide is provided herein. In one aspect of the invention, there is a lockset drilling guide that comprises a frame. The frame comprises a first flange and a second flange. The second flange is capable of flexing relative to the first flange. The lockset drilling guide further comprises at least a first opening and a second opening defined in the frame. The first opening is positioned at approximately 90 degrees relative to the second opening. A positioning member is mounted on the frame, wherein the positioning member is laterally movable to at least two positions relative to the frame. The frame is configured for mounting on a door to facilitate the forming of holes in the door for the installation of a lockset.

In another aspect of the invention, there is provided a lockset drilling guide kit that comprises a lockset drilling guide having a frame with a first flange and a second flange. The second flange is capable of flexing relative to the first flange. There is at least a first opening and a second opening defined in the frame; the first opening is positioned at approximately 90 degrees to the second opening. The lockset drilling guide further comprises a positioning member mounted on the frame, wherein the positioning member is laterally movable to at least two positions relative to the flanges. The kit further comprises a first hole-boring device.

In yet another aspect of the invention, there is provided a method of forming a hole in a door for the placement of a lockset. The method comprises providing a lockset drilling guide that has a frame with a first flange and a second flange. There is at least a first opening defined in the frame. There is a positioning member mounted on the frame; the positioning member is laterally movable to at least two positions relative to the flanges. The method further comprises moving the positioning member to one of the at least two positions, orienting the lockset drilling guide relative to the door, mounting the lockset drilling guide to the door so that at least one of the openings is positioned on the door at a predetermined location, inserting a drilling tool within the first opening and operating the tool to form a hole in the door substantially concentric with the first opening.

In yet another aspect of the invention, there is provided a lockset drilling guide that comprises first, second and central flanges. Each of the flanges defines at least one opening. Each of the flanges is in fixed in relation to the other to form a substantially T-shaped frame so that the central flange is positioned substantially perpendicularly to both the first and the second flanges. A first guide region is defined by the first flange and the central flange. A second guide region is defined by the second flange and the central flange. The frame is configured for mounting on a door to facilitate the forming of holes in the door for the installation of a lockset.

In yet another aspect of the invention, there is provided a lockset drilling guide kit that comprises a first hole-boring device and a lockset drilling guide. The lockset drilling guide comprises a first, second and central flange, each of the flanges defining at least one opening and each of the flanges being in fixed in relation to each other to form a substantially T-shaped frame and forming two guide regions. A first guide region is defined by the first flange and the central flange. A second guide region is defined by the second flange and the central flange.

In yet another aspect of the invention, there is provided a method of forming a hole in a door for the placement of a lockset. The method comprises providing a door and providing a lockset drilling guide. The lockset drilling guide comprises first, second and central flanges, each of the flanges defining at least one opening and each of the flanges being in fixed in relation to each other to form a substantially T-shaped frame and forming two guide regions. A first guide region is defined by the first flange and the central flange. A second guide region is defined by the second flange and the central flange. The method further comprises mounting the lockset drilling guide to the door so that the central flange and either the first or the second flange are substantially adjacent to the door and inserting a drilling tool within one of the openings and forming a hole by the drilling tool.

In yet another aspect of the invention, there is provided a lockset drilling guide that comprises a frame having a first flange and a second flange mounted perpendicularly to each other, so that each of the flanges defines an opening. The lockset drilling guide further comprises a positioning member that defines an opening that is off-center relative to a center axis though the positioning member, wherein the positioning member is capable of mating with the opening of the first flange. The positioning member is rotatable with respect to the frame. The positioning member laterally displaces the off-center opening relative to the frame when the positioning member is rotated about said center axis. The guide is configured for mounting on a door to facilitate the forming of holes in the door for the installation of a lockset.

In yet another aspect of the invention, there is provided a lockset drilling guide kit that comprises a first hole-boring device and a lockset drilling guide having a frame. The frame comprises a first flange and a second flange mounted perpendicularly to the first flange; each of the flanges defines an opening. The lockset drilling guide further comprises a positioning member that defines an opening that is off-center relative to a center axis through the positioning member, wherein the positioning member is capable of mating with the opening of the first flange. The positioning member is rotatable with respect to the frame and laterally displaces the off-center opening relative to the frame when the positioning member is rotated.

In yet another aspect of the invention, there is provided a method of forming a hole in a door for the placement of a lockset, comprising providing a door and providing a lockset drilling guide. The lockset drilling guide comprises a frame comprising a first flange and a second flange mounted perpendicularly thereto. Each of the flanges defines an opening. The lockset drilling guide further comprises a positioning member that defines an opening that is off-center relative to a center axis through the positioning member, wherein the positioning member is capable of mating with the opening of the first flange. The method further comprises rotating the positioning member about the axis to place the off-center opening at a predetermined lateral position relative to the frame, mounting the lockset drilling guide to the door and inserting a drilling tool within the off-center opening and forming a hole by the drilling tool.

In yet another aspect of the invention, there is provided a trim jig cutter that comprises a hole-boring device. A bushing that surrounds the hole-boring device has a small diameter and a large diameter. A trim plate has at least one opening of a width that is at least slightly more than the small diameter and less than the large diameter.

Other objects and advantages will be apparent from the following description of the invention, and the various features of that invention will be particularly pointed out in conjunction with the preferred embodiments. As realized, the invention is capable of other and different embodiments, and its details are capable of modification in various respect. Accordingly, the drawings and description are to be regarded as illustrative in nature and not as restrictive.

BRIEF DESCRIPTION OF SEVERAL VIEWS OF THE DRAWINGS

The present embodiments of the invention are illustrated in the accompanying drawings wherein:

FIG. 16 shows an exploded perspective view of a third embodiment of a lockset drilling guide in accordance with the present invention;

FIG. 17 shows a perspective view of the lockset drilling guide of FIG. 16;

FIG. 18 shows a perspective view of a fourth embodiment of a lockset drilling guide;

DETAILED DESCRIPTION OF THE PREFERRED EMBODIMENTS

Figure 1:
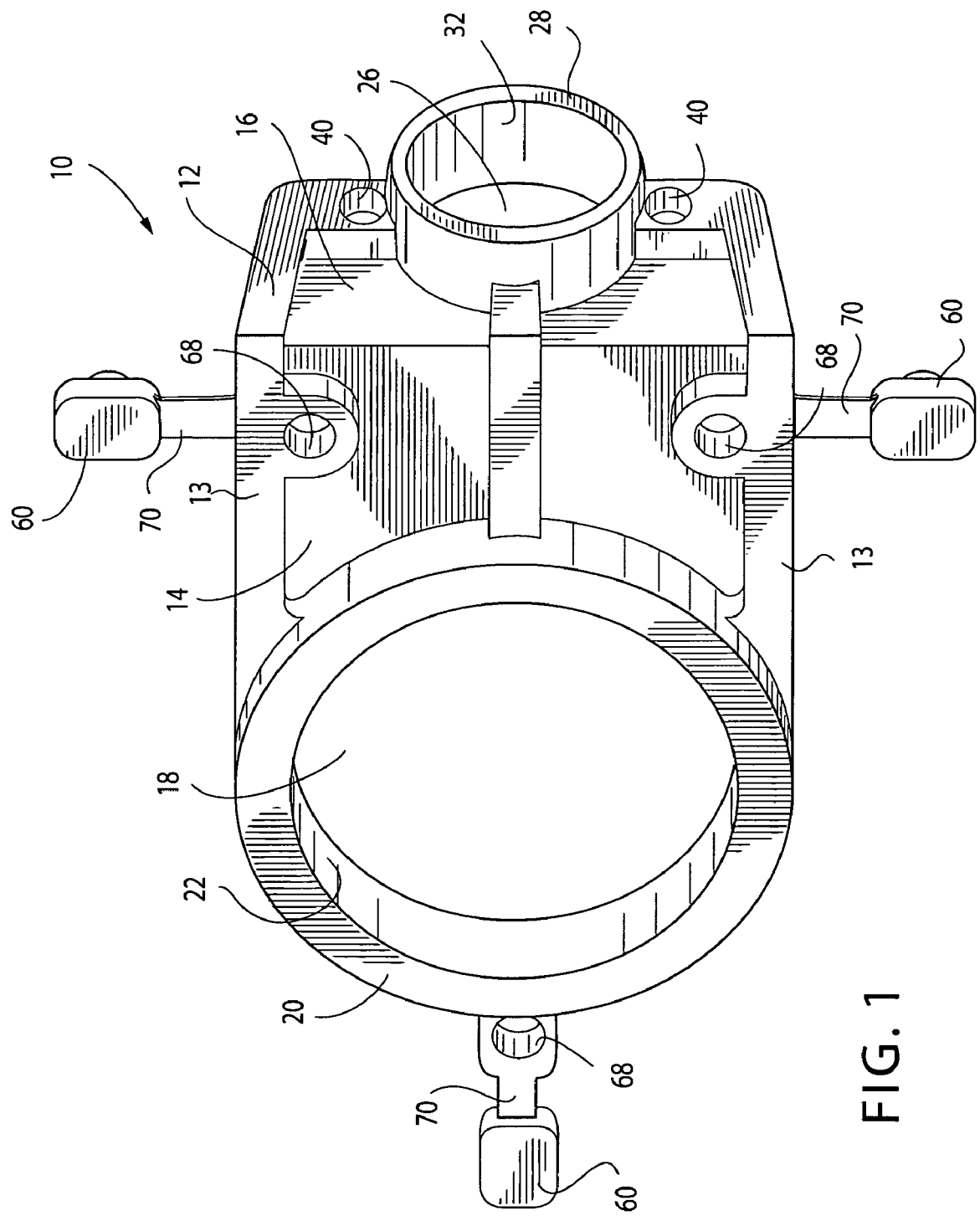
FIG. 1 is a perspective view of a first embodiment of the lockset drilling guide in accordance with the present invention.
Figure 2:
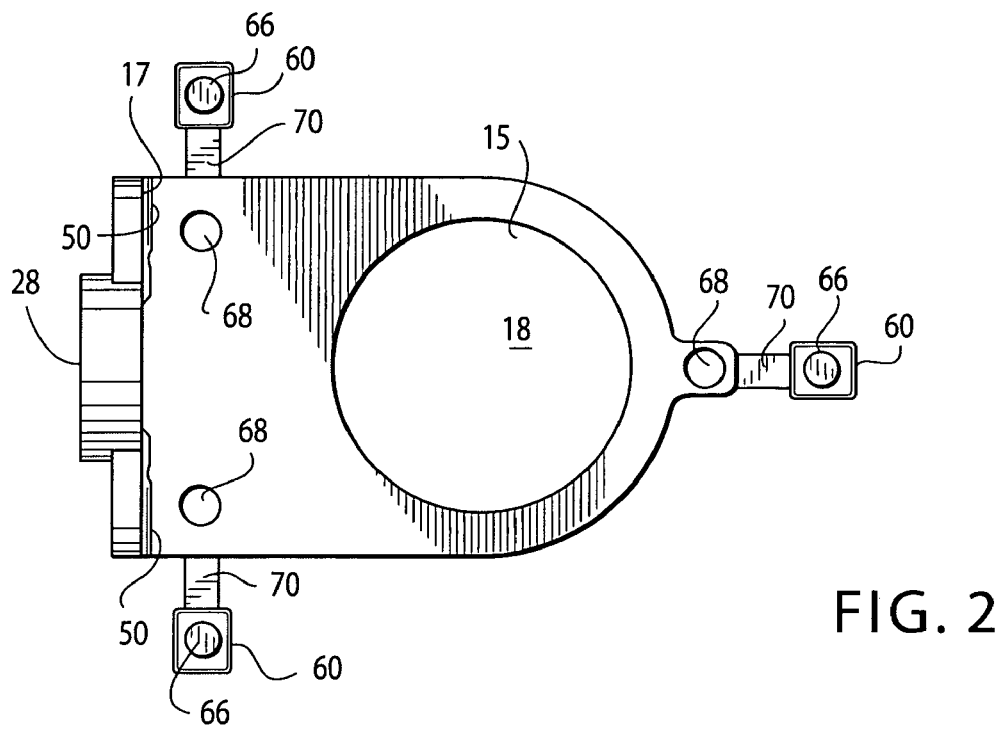
FIG. 2 is a front elevational view of FIG. 1.
Figure 3:
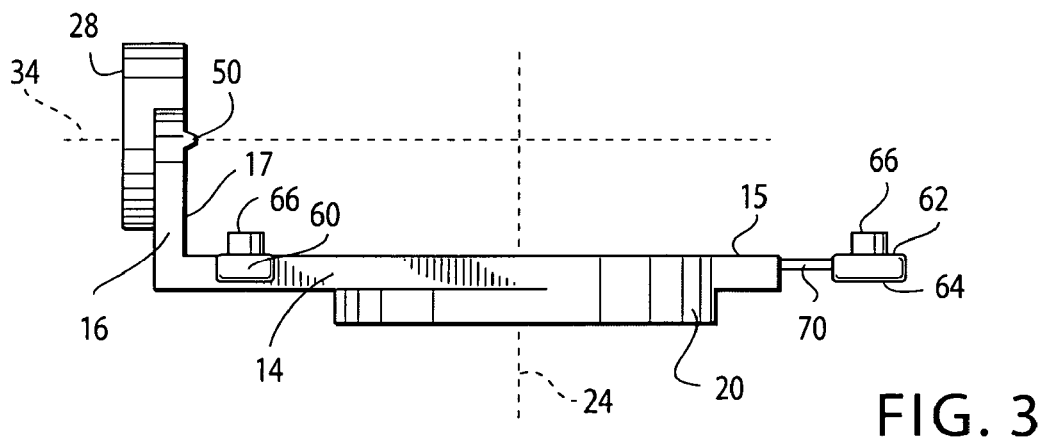
FIG. 3 is a top elevational view of FIG. 1.

A preferred embodiment of the invention is shown as a drilling guide 10 having a frame 12 as shown in the various views of FIGS. 1-5. The frame 12 is generally L-shaped in that the frame 12 includes a first flange 14 and a second flange 16 positioned relative to each to each other at a 90 degree angle. The first flange 14 preferably defines a generally flat, planar rear face 15 and a second flange 16 preferably defines a generally flat rear face 17. A pair of upstanding, elongated spacing ridges 50 is provided along the rear face 17 of the second flange 16 to account for positioning along beveled door edges. The first flange 14 preferably defines a first circular opening 18 surrounded by an annular lip 20 that is configured as an upstanding right cylindrical section. The annular lip 20 defines a right cylindrical wall 22 on the interior of the opening. It is preferred that the annular lip 20 upstands in a direction opposite that of the rear face 15 so that the rear face 15 remains generally flat. Preferably, the right cylindrical wall 22 defines a first central axis 24 that is generally perpendicular to the plane of the rear face 15 of the first flange 14, as best seen in FIG. 3.

Figure 4:
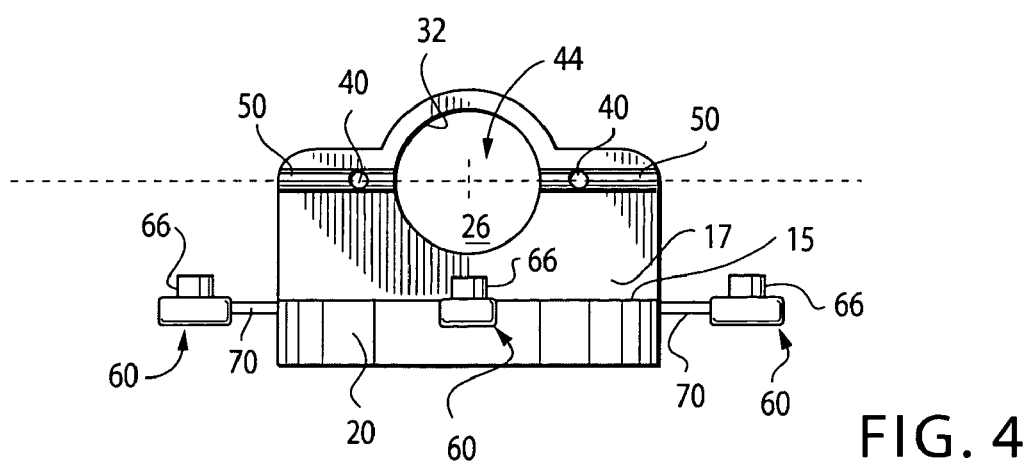
FIG. 4 is a left-side elevational view of FIG. 1.
Figure 5:
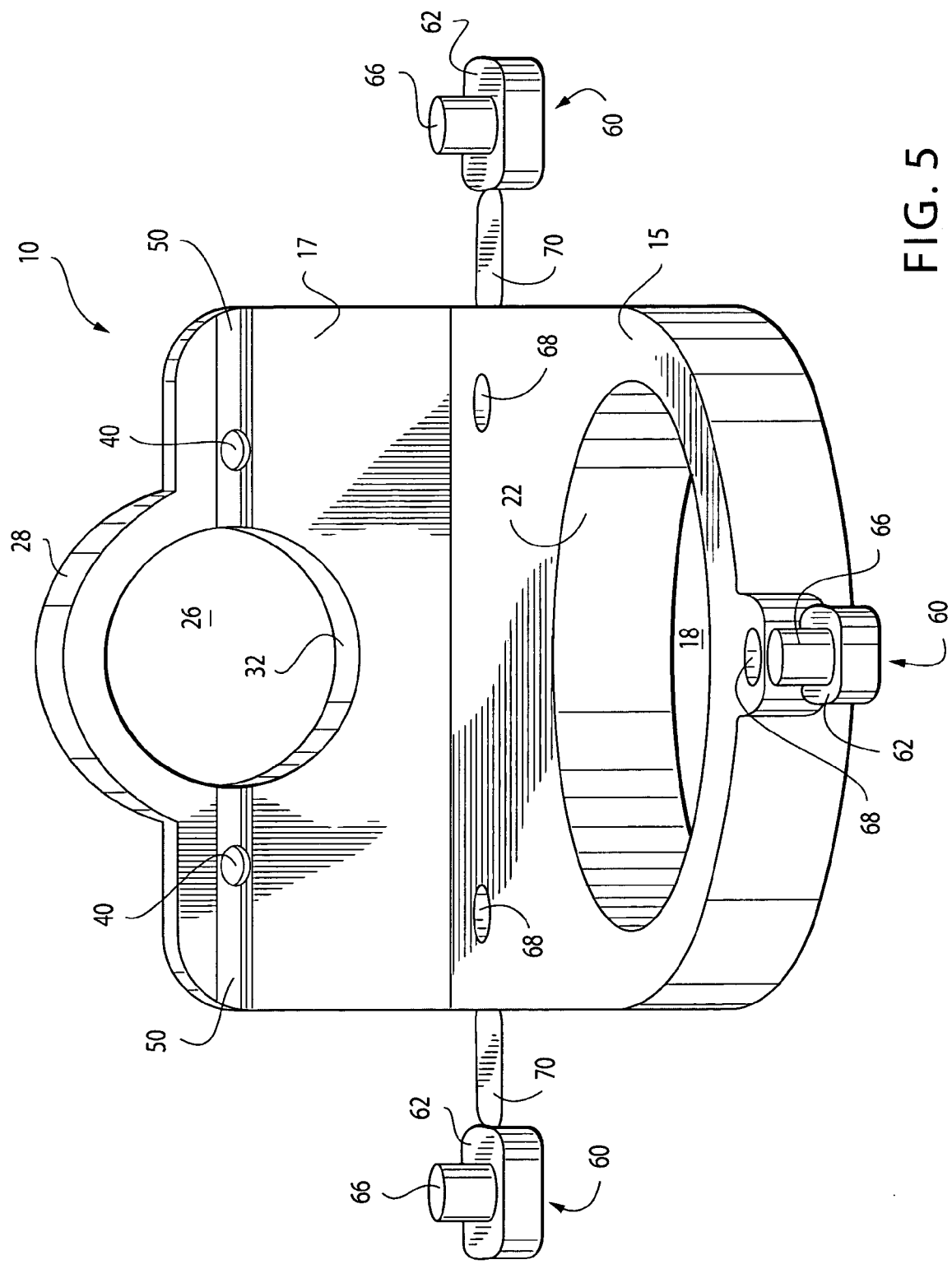
FIG. 5 is a perspective view of the lockset drilling guide of FIG. 1 showing the rear portion thereof.

The second flange 16 preferably defines a second opening 26 surrounded by an annular lip 28. The annular lip 28 preferably upstands in an opposite direction from the rear face 17 of the second flange 16, and, like the annular lip 20, extends in a right cylindrical section from the flange 16. The annular lip 28 preferably defines a right cylindrical wall 32 on the interior of the second opening 26. The right cylindrical wall 32 preferably defines a second central axis 34 that extends perpendicularly to the rear face 17 of the second flange 16 as shown best in FIG. 3. Thus, as shown in FIG. 3, the axes 24 and 34 of the first opening 18 and the second opening 26, respectively, intersect at a 90 degree angle. The second flange 16 also preferably defines a pair of through-going mounting openings 40 that are positioned to surround the second opening 26. Preferably, the centers of the mounting openings 40 are aligned with the center 44 of the second opening 26 as shown in FIG. 4. Preferably, the mounting openings 40 are positioned relative to the second opening 26 on the second flange 16 to correspond to similar latch plate mounting openings on standard latch plates.

Preferably, the right cylindrical wall 22 defining the first opening 18 is 2⅛ inches in diameter, and the right cylindrical wall 32 of the second opening 26 is 1 inch in diameter. In one embodiment, these measurements allow the right cylindrical wall 22 of the first opening 18 to closely surround and guide a standard holesaw having a 2⅛-inch diameter within the opening 18 so that the saw remains generally perpendicular to the rear face 15 during the drilling process. Similarly, the right cylindrical wall 32 of the opening 26 closely surrounds and is able to guide a smaller standard-sized holesaw for drilling a hole of 1 inch in diameter, thus keeping the holesaw perpendicular to the rear face 17 during the drilling process.

Figure 7:
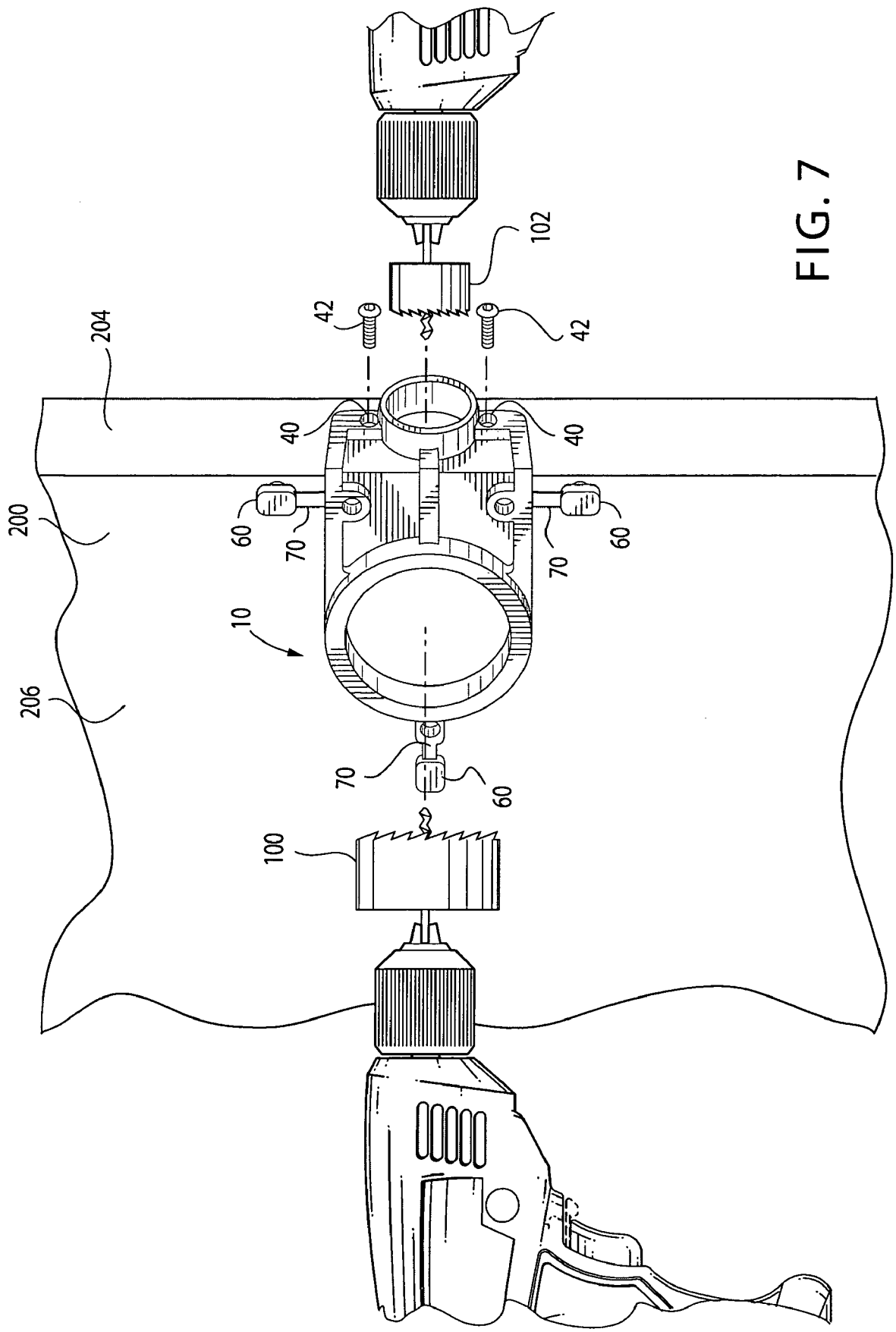
FIG. 7 is a perspective view of the embodiment shown in FIG. 1 installed on the edge of a door and showing various aspects of the lockset installation process.
Figure 8:
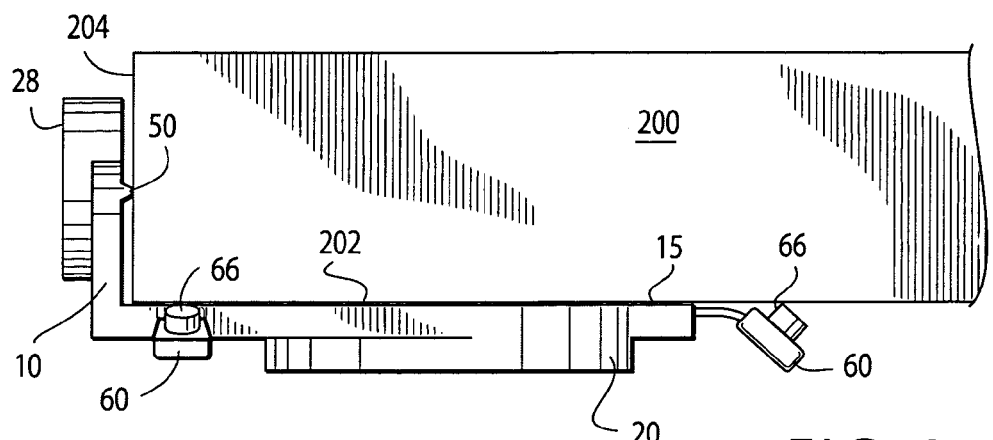
FIG. 8 is a top elevational view similar to that of FIG. 3 showing the installation of the drilling guide on a standard, non-beveled door.

FIG. 7 shows the forward edge of a door 200 that is being prepared for drilling. FIG. 7 also illustrates the holesaws 100, 102 adjacent the openings 18 and 26, respectively, on the drilling guide 10 positioned on an undrilled door 200. The door 200 preferably includes a door face 202 and a door edge 204. As shown in the drawing, the drilling guide 10 may be mounted to the door 200 so that the rear face 15 of the first flange 14 is positioned flush to the door face 202 and the spacing ridges 50 on the rear face 17 of the second flange 16 are positioned against the door edge 204. This is shown in FIG. 8. The drilling guide 10 may be mounted to the door edge 204 using a pair of screws 42 inserted through the mounting openings 40 in the second flange 16. Preferably, in the preferred embodiment, the screws 42 may be the same screws that are provided with a conventional lockset. Conveniently, once the drilling process is completed and the drilling guide 10 is removed from the door 200, the screws 42 may be reused to attach the latch plate to the door edge 204. The area surrounding the newly drilled opening will of course require a section properly mortised to fit the latch plate (not shown).

Figure 9:
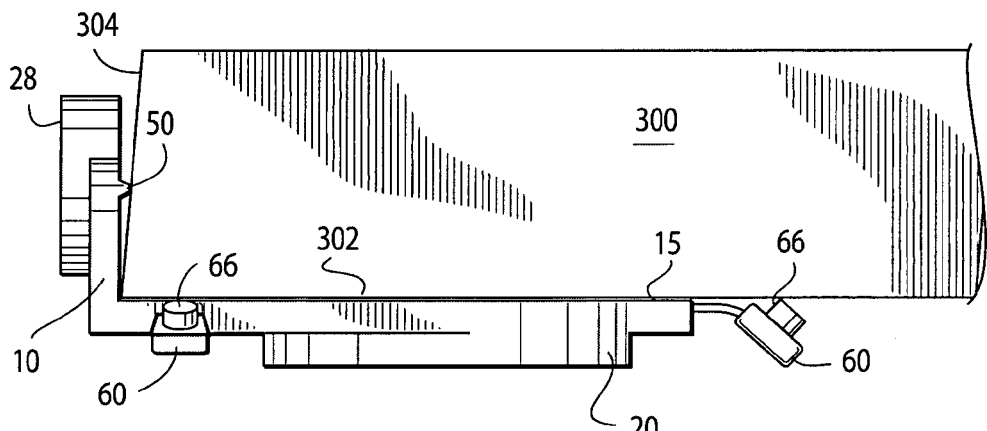
FIG. 9 is an elevational view similar to that of FIGS. 3 and 8 showing the installation of the drilling guide on a beveled door.

When the drilling guide 10 is mounted with the frame 12 against a conventional-edge door 200, the spacing ridges 50 are positioned against a flat door edge 204. The proper positioning of the rear face 15 of the first flange 14 against the door face 202 allows the plane of the rear face to be properly aligned perpendicularly to the door edge 204, and the center line 44 of the opening 26 aligned with the center line of door edge 204. This is shown in FIGS. 7 and 8. When the drilling guide 10 is properly positioned on the door 200, wherein the door is of a non-beveled edge configuration, the spacing ridges 50 are positioned on the edge 204 of the door as shown in FIG. 8. In the event that the door includes a beveled edge 304 as shown in FIG. 9, the spacing ridges 50 properly provide stability to the second flange 16 and engage the beveled edge 304 of the door 300.

Because the most often-used interior door sizes have thicknesses of 1⅜ inches and 1¾ inches, the drilling guide of the present invention may be adjusted for use on doors having at least these two thicknesses. In the preferred embodiment, the rear face 15 of the first flange 14 is placed flush against the face 202 of the door 200 for a 1¾-inch thick standard door as shown in FIG. 8. On thinner 1⅜-inch doors, it is desirable to adjust the guide so that the center line 44 of the second opening 26 on the flange 16 is still properly positioned along the center line of the edge of the thinner door. In order to accommodate this adjustment, a plurality of removable spacing tabs 60 is provided in the preferred embodiment. Preferably, the spacing tabs 60 are defined with generally parallel opposed surfaces 62 and 64. The surface 62 of each tab 60 preferably includes an upstanding peg 66 that is sized to removably engage a corresponding opening 68 on the rear face 15 of the first flange 14. Preferably, each of the spacing tabs 60 is flexibly attached by an integral, flexible strap 70 to the frame 12. In the preferred embodiment, the three spacing tabs 60 are provided around the periphery of the first flange 14. The straps 70 may be integrally molded of the same plastic or may include molded-in or co-molded elastomeric rubber to provide more flexibility.

Figure 6:
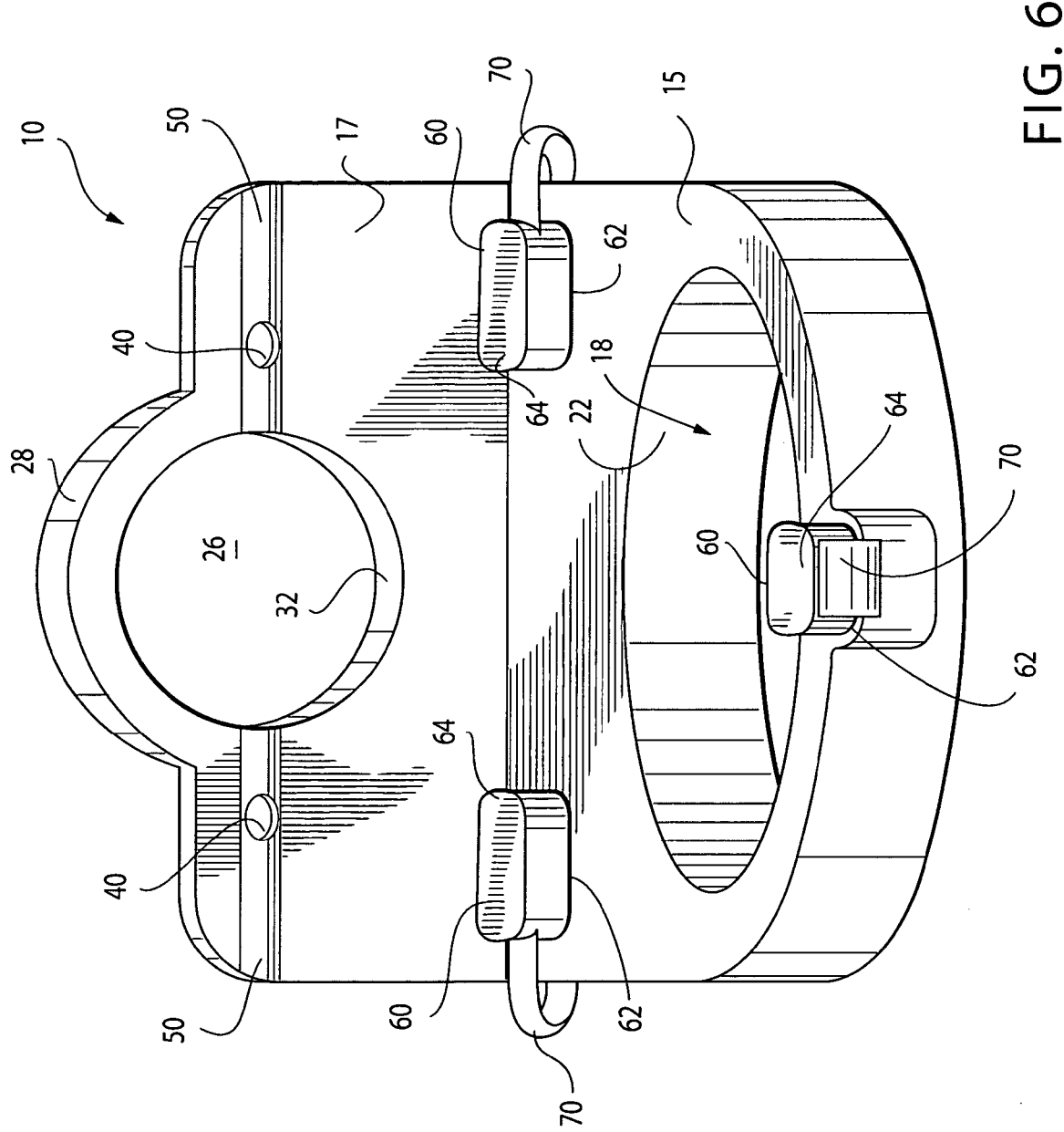
FIG. 6 is a perspective view similar to that of FIG. 5, showing the adjustment tabs positioned and installed on the frame of the preferred embodiment.

In use, when it desired to use the drilling guide 10 on a door of reduced standard thickness, the tabs 60 may be inserted into each corresponding opening 68 in the rear face 15 as shown in FIG. 6. The thickness of the tab 60, in particular the distance between the opposed surfaces 62 and 64, raises the first flange 14 slightly above the face of the door on which it is installed. Thus, the drilling guide 10 contacts the face of the reduced-thickness door only via the surfaces 64 of the tabs 60 in this configuration. This is shown in the top view of FIG. 10, which illustrates the mounted guide 10 on a thinner door 400.

When it is desired to re-use the drilling guide 10 on a door of increased standard thickness such as the door 200 shown in FIG. 8, the tabs 60 may be removed from the openings 68 and used as described above. Note that in FIG. 8, the spacing tabs 60 are allowed to flex away from the face 202 of the door 200 when the guide 10 is mounted thereto. Thus, the drilling guide 10 may be quickly reconfigured for use on various standard-sized doors.

It should be noted that further adjustment options may be implemented in the preferred embodiment to allow use of the drilling guide 10 on doors of a variety of thicknesses. For example, a plurality of tabs of differing thicknesses may be provided for use on doors having a variety of thicknesses. Furthermore, the first opening 18 and the second opening 26 may be modified to receive properly sized holesaws, and the collars may also include an upstanding annulet or flange that varies the spacing between the rear 15 and the face of the door. Other alternative structures may of course be provided within the scope of the invention.

In use, to enlarge existing lockset holes or otherwise drill lockset holes in a blank door, the user need only take a few simple steps. First, the user will set the drilling guide 10 for the proper door thickness. If used on a thicker door such as the door 200 first, the spacing tabs 60 will be removed and remain unengaged from the face 15 of the first flange 14 as shown in FIGS. 1-5 and 7-8. The drilling guide 10 is then positioned at the appropriate height on the door 200 as shown in FIG. 7. Attachment screws 42 from the lockset are then inserted through the openings 40 in the second flange 16 to firmly attach the drilling guide 10 to the edge 204 of the door 200. If desired, small pilot holes may be drilled through the openings 40 before inserting the screws 42. Once the drilling guide is mounted in place, the appropriately sized holesaws 100, 102 may be used to drill the properly sized lockset holes in the door 200. The right cylindrical walls 22 and 32 of the first and second openings 18 and 26, respectively, effectively guide the outer portions of the holesaws 100, 102 during the drilling operation. Once the holes are drilled in the door 200, the user need only remove the screws 42 from the openings 40 to remove the drilling guide 10 from the door 200. The user may then install the lockset and the latch plate using the screws 42 inserted into the previously made openings on the door edge 204.

Figure 10:
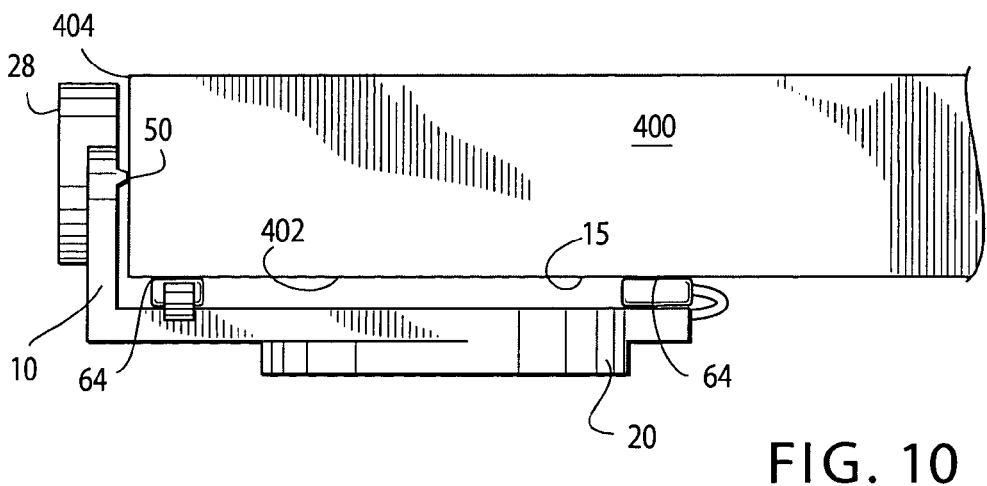
FIG. 10 is a top elevational view similar to FIGS. 3, 8 and 9 showing the drilling guide installed on a door of reduced thickness.

The drilling guide 10 may then be adjusted for use on a door having less thickness than the previous door 200, such as door 400 of FIG. 10. To adjust the drilling guide 10, the user inserts the pegs 66 of the three spacing tabs 60 into the corresponding three openings 68 on the rear face 17 of the second flange 16. The drilling guide 10 is then mounted on the door as shown in FIG. 10, and the same procedures are followed for drilling the holes in the door as described above in conjunction with FIG. 7.

The frame 12 is preferably an integral, one-piece design molded from a rigid and durable plastic material. Exemplary plastic materials include ABS plastic, LEXAN® or hard rubber materials. Also, the frame may be constructed from machined or molded metal, such as aluminum. In addition, the tabs 60 may be formed from rubber or similar flexible material and the tabs 60 may be mated to the frame 12 when the frame 12 is constructed from metal. It is intended that various framing artifacts, such as the bulkheads 13, may vary in position to provide proper support to the frame 12 depending on the particular material being used. In the alternative, such artifacts and bulkheads 13 may be eliminated completely as long as support to the shape of the frame 12 is adequately maintained and depending on the material from which it is constructed.

Figure 11:
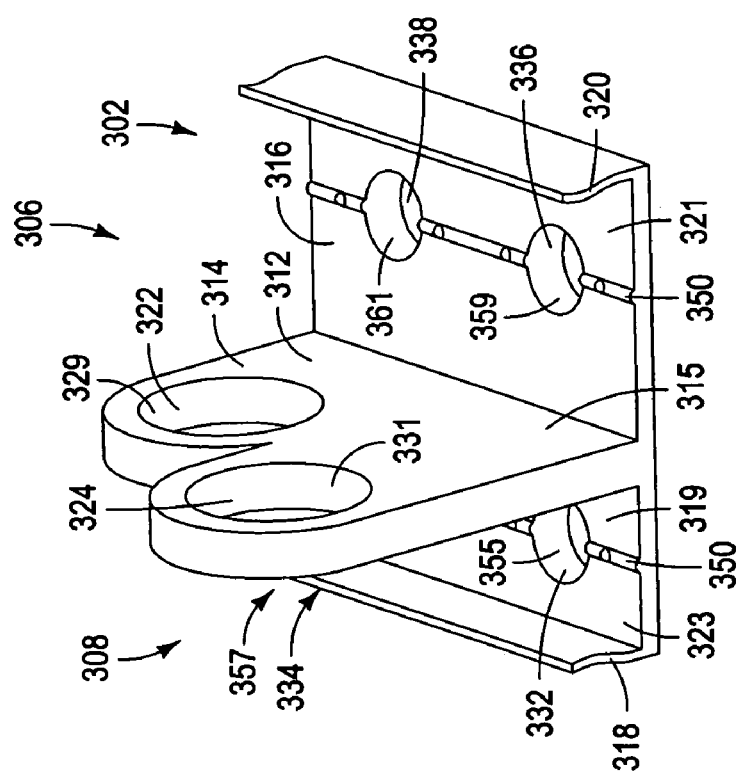
FIG. 11 is a perspective view of a second embodiment of the lockset drilling guide in accordance with the present invention.

An alternative embodiment of a drilling guide 302 having a frame 312 is shown in FIG. 11. The frame 312 is generally T-shaped in that frame 312 includes a central flange 314. A first flange 316 and a second flange 319 are both positioned at a 90 degree angle relative to the central flange 314. A third flange 318 and a fourth flange 320 extend from the second flange 319 and first flange 316, respectively. The third flange 318 and fourth flange 320 are generally parallel to the central flange 314, but are biased towards the central flange 314.

Figure 13:
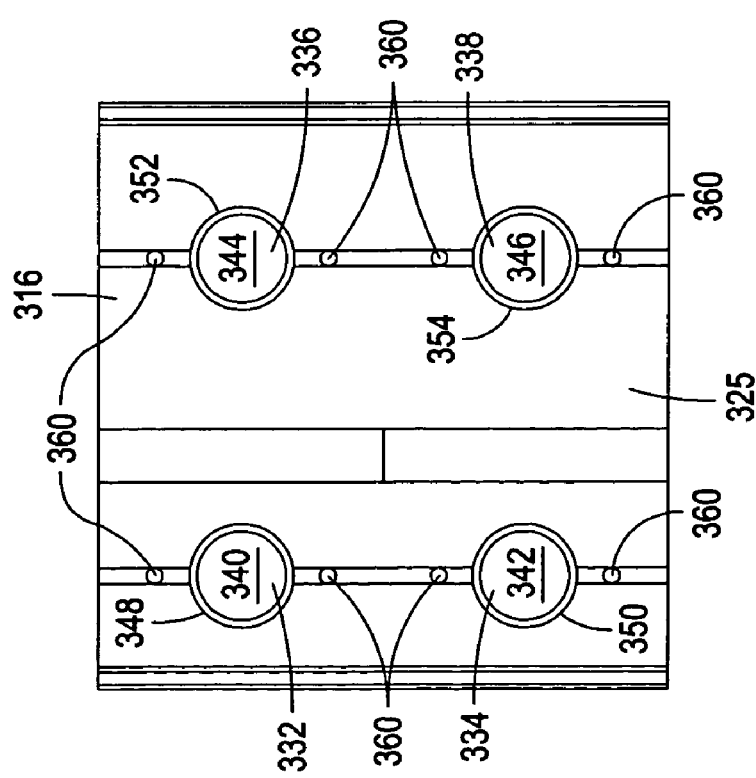
FIG. 13 is a front plan view of the drilling guide of FIG. 11.
Figure 15:
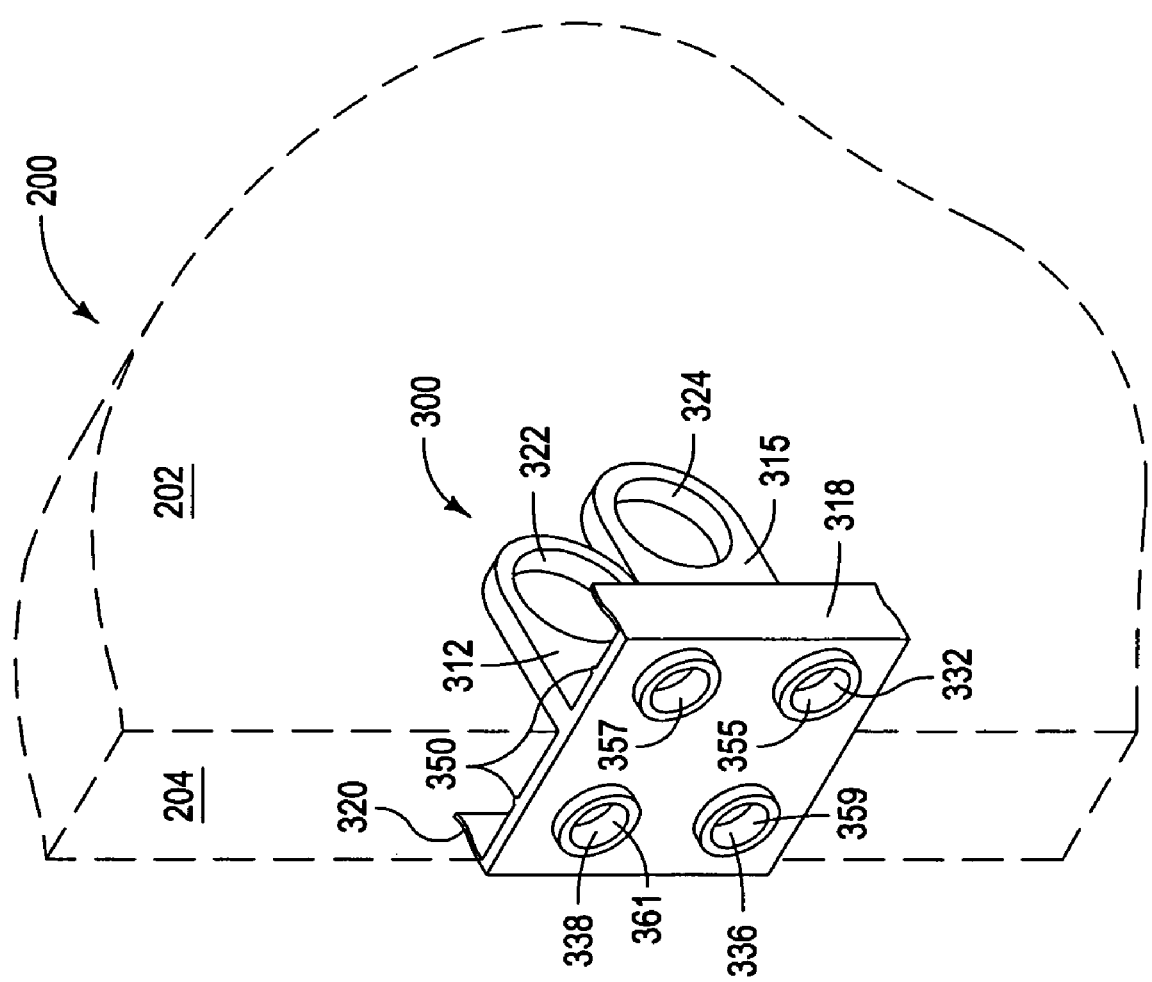
FIG. 15 is a perspective view of the drilling guide of FIG. 11 mounted on a door.

The central flange 314 preferably defines a pair of generally flat planar faces 315, 317. The first flange 316 has a generally flat planar rear face 321; the second flange 319 also has a generally flat planar rear face 323. Together, the first flange 316 and second flange 319 form a generally flat planar front face 325, as shown in FIG. 13.

Figure 12:
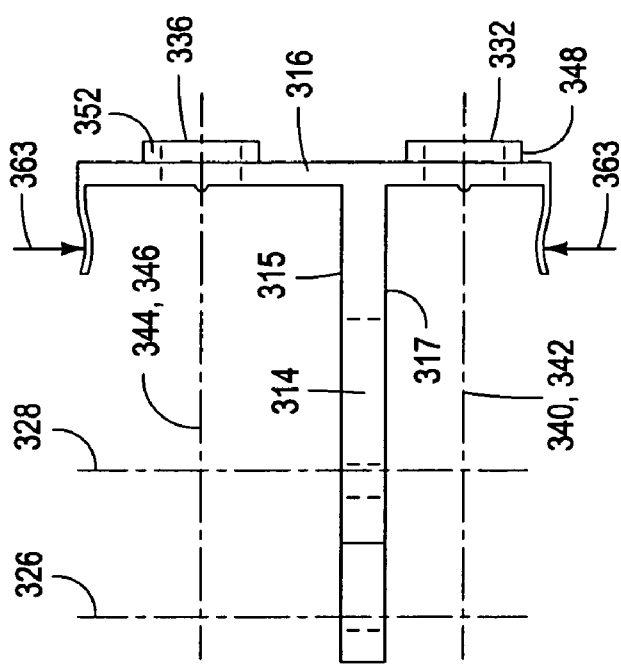
FIG. 12 is a top plan view of the drilling guide of FIG. 11.
Figure 14:
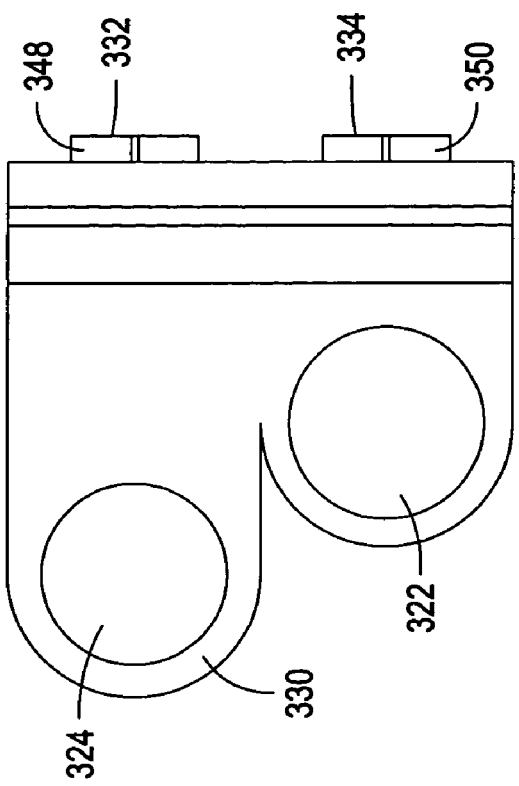
FIG. 14 is a left-side plan view of the drilling guide of FIG. 11.

A pair of upstanding, elongated spacing ridges 350 is provided along the rear faces 321, 323 to account for positioning along beveled door edges. The central flange 314 preferably defines a pair of circular openings 322, 324 which have right cylindrical interior walls 329, 331 for guiding a drill bit or other cutting device. A first through-going axis 326 is defined through the first circular opening 322 that is generally perpendicular to the central flange 314 of the frame 312, as shown in FIG. 12. A second through-going central axis 328 is defined through the second circular opening 324. An outer edge 330 of the central flange 314 opposite the first flange 316 may be curved to follow the contour of the circular openings 322, 324, as shown in FIG. 14. Alternatively, the outer edge 330 may be planar and generally perpendicular to the central flange 314.

The first flange 316 defines a plurality of circular openings, preferably two circular openings 336, 338. The second flange 319 also defines a plurality of circular openings, preferably two circular openings 332, 334. A plurality of through-going axes 340-346, respectively, are defined through the circular openings 332-338 that are generally perpendicular to the first flange 316 and second flange 318 of the frame 312. Thus, as shown in FIG. 12, the axes 326, 328 intersect with the axes 340-346 at a 90 degree angle. The circular openings 332-338 preferably are each surrounded by an annular lip 348-354, respectively. Each annular lip 348-354 preferably upstands away from the rear face 325 of the first flange 316 and defines a right cylindrical wall 355, 357, 359, 361 through the flanges 316, 319. The right cylindrical walls 355, 357, 359, 361 help guide the holesaw of other cutting device. The first flange 316 and second flange 319 also preferably define pairs of through-going mounting openings 360 that are positioned to surround the openings 332-338. Preferably, the centers of the mounting openings 360 are aligned with the respective centers 340-346, of the openings 332-338 as shown in FIG. 13. Preferably, the mounting openings 360 are positioned relative to each opening 332-338 on the first flange 316 and second flange 319 to correspond to similar latch plate mounting openings on standard latch plates.

Preferably, the circular openings 322, 324 are 2⅛ inches in diameter and the circular openings 332-338 are 1 inch in diameter. As described above, these measurements allow each interior right cylindrical wall 355, 357, 359, 361 to closely surround and guide a standard-sized holesaw having a 1 inch diameter, thus keeping the holesaw perpendicular to the front face 325 of the first flange 316 or second flange 319. Similarly, the interior walls of the circular openings 322, 324 formed in the central flange 314 surround and guide a standard-sized holesaw having a 2⅛-inch diameter so that the saw remains generally perpendicular to the faces 315, 317 of the central flange 314.

The flanges 314, 316, 318, 319, 320 form a first guide region 306 and a second guide region 308, which may vary from each other to suit different door widths. For example, the fourth flange 320 may be spaced approximately 1¾ inch from the face 315 of the central flange 314 and the third flange 318 may be spaced 1⅜ inch from the face 317 of the central flange 314. This allows the drilling guide 302 to be used on doors having thicknesses of 1⅜ inches and 1¾ inches. The drilling guide 302 may also be used for locksets requiring a center opening on a first face 202 of the door 200 that is backset from a second face of the door 204. The center opening may be back set about 2⅜ inches from the face 204 or about 2¾ inches from the face 204.

For use with a standard 1¾-inch thick door, the first guide region 306 is used by placing the rear face 321 of the first flange 316 against the edge 204 of the door 200. The central flange 314 is placed against the face 202 and the fourth flange 320 is placed against a third face 206 to help to hold the frame 312 in position on the door 200. Because the fourth flange 320 is biased towards the central flange 314, the two flanges work together to clamp onto a door 200. The guide 302 is shifted higher or lower to place the 2⅜-inch lockset opening 322 at the proper height on the door. When the lockset for which the drilling guide is being used requires a center opening that is backset 2⅜ inches from the face 204 of the door 200, the circular opening 322 on the central flange 314 may be used to guide the holesaw for making the opening in the face 202 of the door 200. For the opening for the lockset in the face 204 of the door 200 to be used with the 2⅜-inch backset hole, the opening 338 in the first flange 316 may be used.

For a lockset requiring an opening that is backset 2¾ inches, on a 1¾-inch thick door, the rear face 321 of the first flange 316 is placed against the face 204 of the door 200 so that the first guide region 306 can be employed. The guide 302 is shifted higher or lower to place the 2¾-inch backset opening 324 at the proper height on the door 200. The circular opening 324 in the central flange 314 is used to guide the holesaw for the opening in the face 202 of the door 200 and the opening 336 in the first flange 316 is used to guide the holesaw for the opening in the face 204 of the door 200.

Similar to the 1¾-inch door 200, the drilling guide 302 may also be used with a 1⅜-inch door 400 for a lockset requiring a 2⅜-inch or 2¾-inch backset opening in a face 402 of the door 400. For a 2⅜-inch backset opening in the face 402 of the door 400, the second guide region 308 is used by placing the rear face 323 of the second flange 319 against the edge 404 of the door 400. Because the third flange 318 is biased towards the central flange 314, the two flanges work together to clamp onto the door 400. When the lockset for which the drilling guide is being used requires a center opening that is backset 2⅜ inches from the edge 404 of the door 400, the circular opening 322 on the central flange 314 may be used to guide the holesaw for making the opening in the face 402 of the door 400. For the opening for the lockset in the edge 404 of the door 400 to be used with the 2⅜-inch backset hole, the opening 334 in the second flange 319 may be used. As before, the drilling guide 302 is oriented vertically on the door 400 to ensure that the height of the intended openings is correct.

For a lockset requiring an opening that is backset 2¾ inches, on a 1⅜-inch thick door, the rear face 323 of the second flange 319 is placed against the edge 404 of the door 400. The circular opening 324 in the central flange 314 is used to guide the holesaw for the opening in the face 402 of the door 400 and the opening 332 in the first flange 316 is used to guide the holesaw for the opening in the edge 404 of the door 400. The guide 302 is shifted higher or lower to place the guide 302 at the proper height on the door 400.

By way of example, holesaws 100, 102 may be used for drilling the openings 322, 338, respectively, on the drilling guide 302 positioned on the undrilled door 200. As described above, the drilling guide 302 may be mounted to the door edge 204 using a pair of screws 42 inserted through the mounting openings 360 in the first flange 316. As described above, which opening 332-338 will be used will depend on the thickness of the door and the required distance from the edge of a door for proper backsetting. The screws will be inserted into the mounting openings 360 surrounding the particular opening 332-338 to be used. The drilling guide 302 may be mounted with the frame 312 against conventional-edge door 200 or 400 wherein the spacing ridges 350 are positioned against a flat door edge. The drilling guide 302 may also be used with a beveled edge door 300 and positioned against a beveled edge 304 as discussed above for the drilling guide 10.

In use, the drilling guide 302 may be mounted on 1¾- or 1⅜-inch thick door and the drilling guide 302 may be used for locksets requiring 2⅜- and 2¾-inch backset openings from the face of the door. The lockset may be mounted using screws 42 in the desired mounting openings 360 and used on the first door 200 having thickness of 1¾ inches. The drilling guide 302 may then be removed from the first door 200 and mounted on the second door having a thickness of 1⅜ inches. The drilling of the holes is as described above for the drilling guide 10. The construction of the frame 312 is as described above for the frame 12.

Another embodiment of the invention is shown as a drilling guide 410 having a frame 412 as shown in the various views of FIGS. 16-17. The frame 412 is generally L-shaped in that the frame 412 includes a first flange 414 and a second flange 416 positioned relative to each to each other at a 90 degree angle. The first flange 414 preferably defines a generally flat, planar rear face 415 and the second flange 416 preferably defines a generally flat rear face 417. The first flange 414 preferably defines a first oblong opening 418 surrounded by an annular lip 420. It is preferred that the annular lip 420 upstands in a direction opposite that of the rear face 415 so that the rear face 415 remains generally flat.

The second flange 416 preferably defines a second opening 426 surrounded by an annular lip 428. The annular lip 428 preferably upstands in an opposite direction from the rear face 417 of the second flange 416, and defines a right cylindrical internal wall 432 through the flange 416 for guiding a holesaw or similar cutting device. The right cylindrical internal wall 432 preferably defines a central axis 434 that extends perpendicularly to the rear face 417 of the second flange 416 as shown best in FIG. 17. The second flange 416 defines a pair of through-going mounting openings 440 that are positioned to surround the second opening 426. Preferably, the centers of the mounting openings 440 are aligned with the center 444 of the second opening 426. Preferably, the mounting openings 440 are positioned relative to the second opening 426 on the second flange 416 to correspond to similar latch plate mounting openings on standard latch plates. Preferably, the right cylindrical wall 432 of the second opening 426 is about 1 inch in diameter.

The drilling guide 410 is designed to be used for doors of various thicknesses, such as 1⅜ inch and 1¾ inch. Regardless of the particular thickness, door locks for a door 200 generally are centered either 2⅜ inches or 2¾ inches from the face 204 of the door 200. To take into account such centering and the various thicknesses, the drilling guide 410 includes a positioning member 460 that is removably mounted to the frame 412. The positioning member 460 is snugly inserted into a recess (not shown) that is formed in the lip 428 and faces the rear face 415.

As shown in FIGS. 16 and 17, the positioning member 460 includes a frame 461 that has a circumference that substantially matches the shape of the recess of the lip 420. The frame 461 includes two projecting annular lips 463, 465 of differing heights that define a single circular opening 469. The opening 469 is not centered in the frame 461, as shown by the distance between the center axis 419 of the opening 469 and the center axis 477 of the positioning member 460. The circular openings of the portions 463, 465 and the opening of the frame 461 share a common axis of symmetry 467 as shown in FIG. 16 and define a single opening 469. As shown in FIG. 16, the frame 461 includes two sets of indicia 471, 473, wherein each set includes a desired door width value and a desired back set value; two other sets of indicia (not shown) are on the opposite side of the frame 461. Note that the height of the annular portion 465 as measured from the frame 461 is selected depending on the desired door width value as will be explained below. Other shapes for the positioning member are possible depending on the desired door width value and desired back set value.

In operation, the user first determines the thickness of the door to be fitted with a lock set. Based on this determination, the user rotates the positioning member 460 to select a particular annular lip 463 or 465 to abut the door so that the opening 426 is centered on the edge of a door. The annular lip of greater height 465, when positioned against the door, will accommodate a wider door. For example, a preferred standard positioning member 460 has an annular lip 465 that accommodates a 1¾-inch thick door while the other annular lip 463 accommodates a 1⅜-inch thick door. Indicia on the positioning member 460 will show which door width can be accommodated by choice of orientating.

Next, the desired backset setting for the lockset is determined. Based on this determination, the user rotates the positioning member 460 around axis 477 until the set of indicia including the desired back set value, in addition to the expected door width, is aligned with a transparent window 481 of the frame 412. At this point, the positioning member 460 is inserted into the recess. More than one positioning member 460 can be included to accommodate more combinations of backsets and door widths.

At this stage, the lockset drilling guide 410 is mounted to a door 200 in a manner similar to the mounting of the lockset drilling guide 10 to the door as described previously with respect to FIG. 7. In particular, the drilling guide 410 may be mounted to the door 200 so that 1) the rear face 475 of the annular portion 465 is positioned flush to the door face 202 and 2) the rear face of 417 of the frame 412 is positioned flush to door face 204. Thus, the annular portion 465 acts as a spacing element that properly positions the opening 426 relative to the door face 202 for a door of a particular width. The rotation of the positioning member 460 acts to offset the opening 469 relative to the door face 204 depending on which end is positioned closer to the second flange 416.

The drilling guide 410 may be mounted to the door edge 204 using a pair of screws 42 inserted through the mounting openings 440 in the second flange 416. Preferably, the screws 42 may be the same screws that are provided with a conventional lockset. Conveniently, once the drilling process is completed and the drilling guide 410 is removed from the door 200, the screws 42 may be reused to attach the latch plate to the door edge 204. The area surrounding the newly drilled opening will of course require a section properly mortised to fit the latch plate (not shown).

After the drilling guide is attached to the door 200, the holesaws 100, 102 are inserted into openings 418, 426, respectively, in order to form openings in the door 200 for the lockset in a manner similar to that described with respect to the embodiment of FIGS. 1-10.

It should be noted that further adjustment options may be implemented in the preferred embodiment to allow use of the drilling guide 10 on doors of a variety of thicknesses. For example, a plurality of tabs of differing thicknesses may be provided for use on doors having a variety of thicknesses. Furthermore, the first opening 418 and the second opening 426 may be modified to receive properly sized holesaws, and the collars may also include an upstanding annulet or flange that varies the spacing between the frame 412 and the door. Other alternative structures may of course be provided within the scope of the invention.

An alternative embodiment of a drilling guide 500 is shown in FIG. 18. This guide 500, like all others described herein, may be used as a stencil for marking the location of future holes or may remain mounted on the door 200 during the drilling process. The frame 512 of the drilling guide 500 is generally C-shaped and includes a first flange 516 and a second flange 518 which are generally parallel to each other, although biased towards each other so that they can clamp onto a door 200; arrows 511 indicate the bias.

The flanges 516, 518 are spaced at a distal location by a connector 520 to which the flanges 516, 518 are connected at approximately right angles. The flanges 516, 518 are preferably mirror-images of each other. This allows holes to be cut in the face of the door 200 from both directions to avoid chipping the door 200, as described above, and helps the drilling guide 500 self-center on door edges of varying widths for proper placement of the lockset.

Circular openings 522, 524 are formed in the respective flanges 516, 518. The circular opening 522 is surrounded by an annular lip 526. The annular lip 526 preferably upstands in a direction away from the face of the door on which the frame 512 may be placed and preferably defines an interior right cylindrical wall 530. The interior right cylindrical wall 530 serves as a guide for a holesaw or similar device. The annular lip 526 preferably defines a first central axis 534 that extends perpendicularly to the plane of the openings 522.

The drilling guide 500 further includes a positioning member 514. The positioning member 514 abuts the side of the door 200 when the guide 500 is in use. The frame 512 is adapted to receive the positioning member 514, which can be moved to one of two or more positions relative to the frame 512 by releasing the detent mechanism 572 and sliding the positioning member 514 laterally relative to the frame 512. By presetting the position of the positioning member 514 relative to the frame 512, the intended backset of the openings 522, 524 is set. The positioning member 514 may be used to backset the openings 522, 524 at, for example, either 2⅜ inches or 2¾ inches from the face 202 of the door 200.

The positioning member 514 further includes upper flange springs 517 on either side of the positioning member 514 that are bent towards each other; any type of spring known to those of skill in the art may be employed. Lower flange springs are not visible in FIG. 18.

The frame is designed to flex so that it can accommodate doors of any thickness within a predetermined range. The frame 512 preferably has a predetermined relaxed width 521 (FIG. 19) that is less than 1⅜ inches but capable of flexing to fit onto a door of 1¾ inches, to accommodate two of the standard widths. Together, the inwardly bent upper flange springs 517 and lower flange springs (not shown) hold the frame 512 in place on the door 200. The flange springs 517 equally deflect force inward to position and center the opening 540 on the second face 204 of the door 200.

Figure 19:
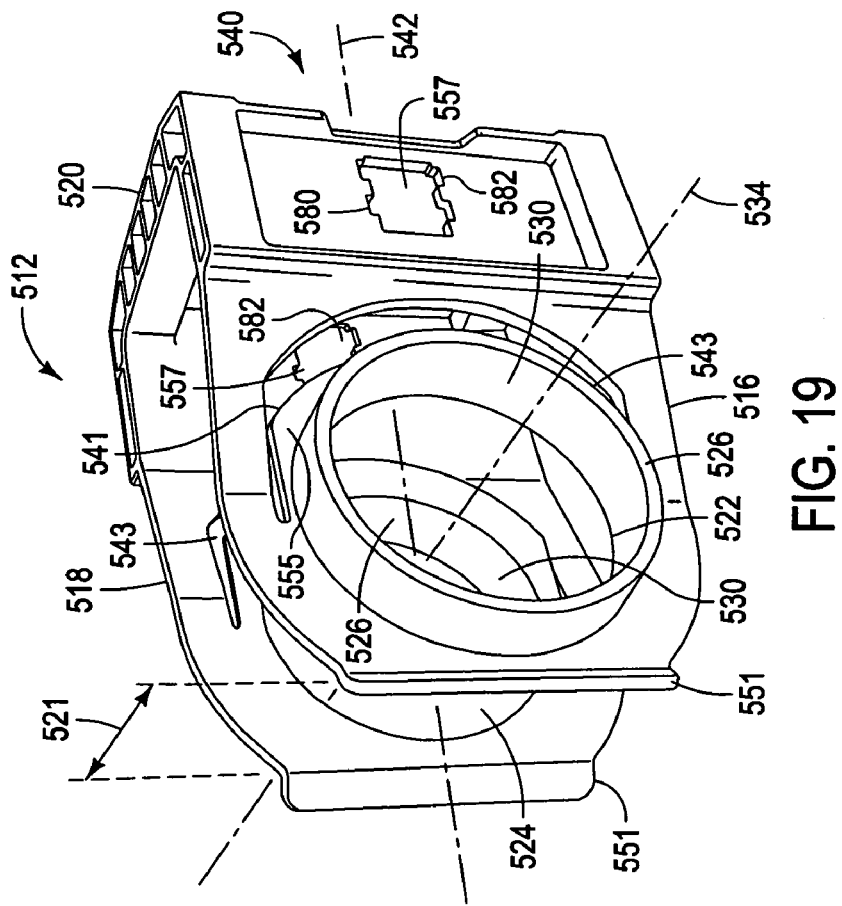
FIG. 19 shows a perspective view of an embodiment of a frame section of the lockset drilling guide of FIG. 18.

FIG. 19 shows the frame 512 of the drilling guide 500 of FIG. 18; the positioning member 514 is not shown. The frame 512 may be formed by any means and from any material known to those of skill in the art. The frame 512 is preferably manufactured in a single piece by molding or casting a plastic, preferably polypropylene. An additive to the polypropylene can vary the flexibility of the frame which preferably corresponds to the range of expected door thicknesses. The frame 512 can also be manufactured from metal.

A central axis 542 is defined through the center of the opening 540 and extends perpendicularly to the axis 534. The flanges 516, 518 are flexible and are preferably angled inward towards each other so that the distance 521 between the flanges 516, 518 is preferably narrower than the lower range of door widths, to help the flanges 516, 518 stay flush with the door 200. The flanges 516, 518 have angled lips 551 which help the flanges 516, 518 splay during the process of positioning the frame 512 on the door 200.

It is not necessary for the connector 520 to be flexible, and it is preferable that the connector 520 is stiffer than the flanges 516, 518. The connector 520 can be reinforced by increased thickness of material, integral honeycomb frame elements, rims and other elements known to those of skill in the art for stiffening a frame. The connector 520 includes an opening 540 through which the positioning member 514 is accessible.

The holes are cut into the face 202 of the door 200 through the openings 522, 524, each of which has an annular lip 526 that defines a cylindrical wall 530. The lips 526 are detached from the flanges 516, 518 at a location 541 close to the connector 520, forming a semicircular slit 543; this helps enable the cylindrical walls 530 to remain perpendicular to the face, 202 of the door 200 regardless of the degree to which the flanges 516, 518 are splayed. A rim 555 that extends from the lip 526 at a location 541 close to the connector 520 helps reinforce the lip 526. An opening 557 near the connector 520 accommodates the detent mechanism 572 of the positioning member 514. The second flange 518 is preferably symmetrical to the first flange 516.

Figure 20:
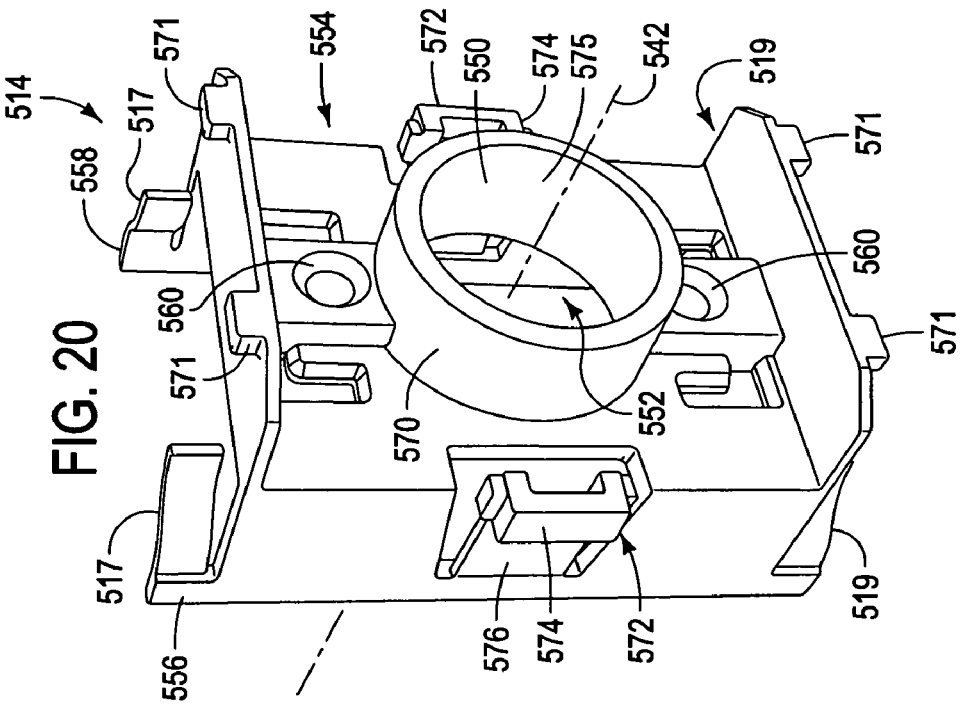
FIG. 20 shows a perspective view of an embodiment of a positioning member section of the lockset drilling guide of FIG. 18.

FIG. 20 shows the positioning member 514 of FIG. 18 without the frame 512. The positioning member 514 includes an opening 550 on a first flange 554. The center 552 of the opening 550 aligns with the axis 542. The positioning member 514 further includes a pair of mounting openings 560 on the first flange 554, similar to the mounting openings described above. Two flanges 556, 558 extend at right angles from the first flange 554 of the spacing element 514 and parallel to each other. The positioning member 514 inserts into the frame 512 with the first flange of the positioning member 514 parallel to the third flange 520 of the frame 512.

The positioning member 514, when attached to the door 200 as a part of the entire drilling guide 500, will be adjacent the edge 204 of the door 200. The positioning member 514 has a circular opening 550 designed to accommodate a holesaw for cutting a hole for the bolt or similar lock element. The opening 550 is surrounded by an annular lip 570. The annular lip 570 defines an internal right cylindrical wall 575 which helps orient the holesaw. Two fastener openings 560 are located on either side of the opening 550, so that their position relative to the opening 550 corresponds to the relative position of the mounting screws of the lockset. Screws or nails can be driven into the door 200 through these holes 560 to secure the drilling guide 500 to the door 200 during the hole-cutting process; this also allows the screw holes for the latchplate to be properly positioned and primed for easy installation of the latchplate.

Two detent mechanisms 572 are on either side of the drilling guide 500. Each detent mechanism 572 includes a peg 574 extending from a flange 576. The flange 576 pushes the peg 574 to engage the openings 557 in the frame 512, in one of two locations, thereby establishing the proper location of the openings 522, 524 to guide the drilling process. Four tabs 571 engage four tracks 573 in the frame 512 (described below) to help the positioning member 514 easily shift laterally between the two positions relative to the frame 512. Four flange springs 517, 519 help center the drilling guide 500.

Figure 22:
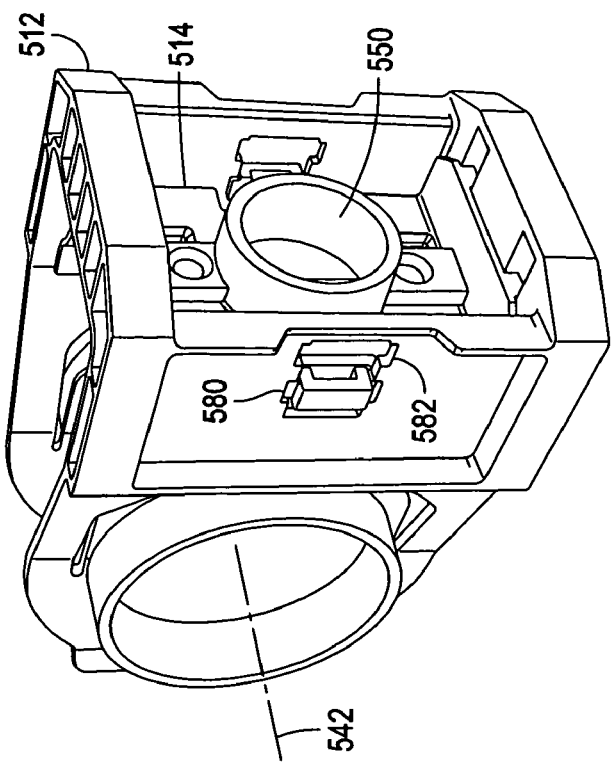
FIG. 22 shows a third perspective view of the lockset drilling guide of FIG. 18.
Figure 21:
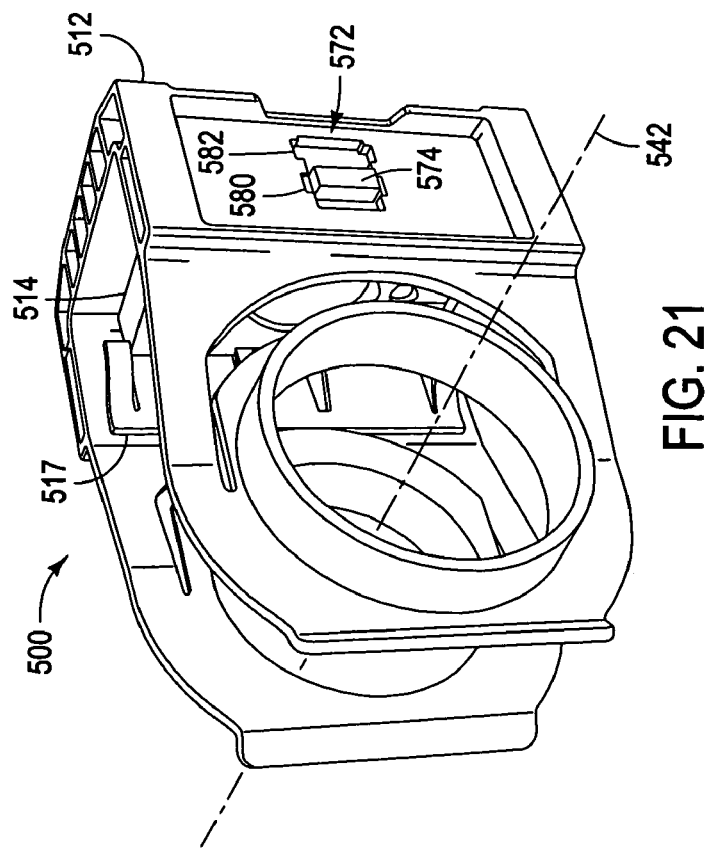
FIG. 21 shows a second perspective view of the lockset drilling guide of FIG. 18.
Figure 23:
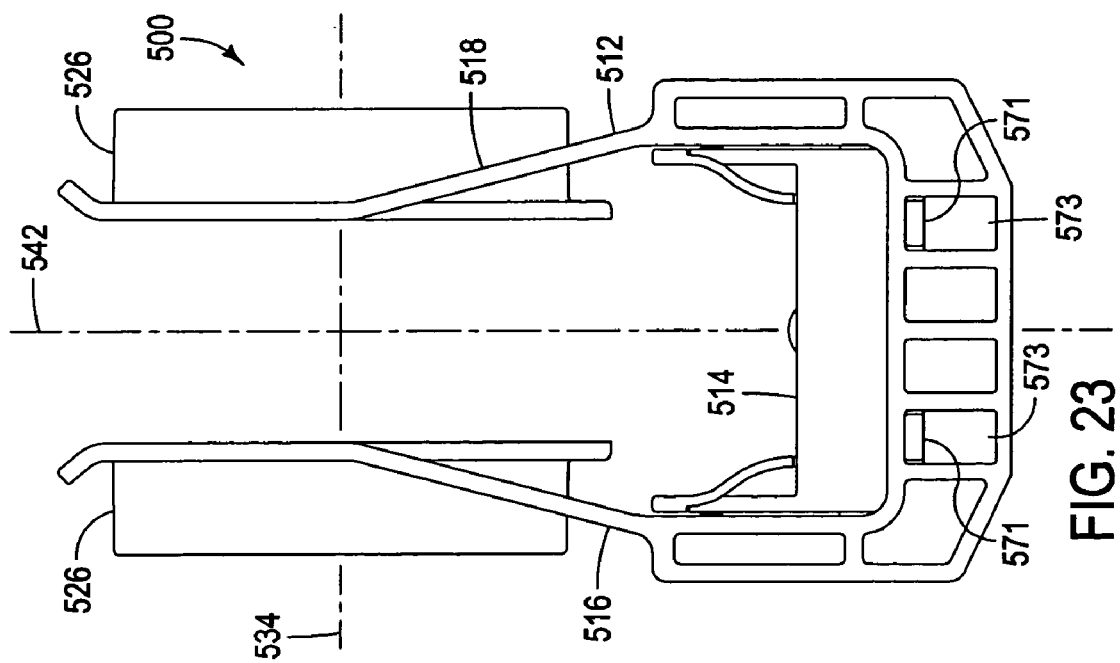
FIG. 23 shows a top plan view of the lockset drilling guide of FIG. 18.

FIG. 21 is a side perspective view of the drilling guide 500 of FIG. 18. The peg 574 of the detent mechanism 572 is sized to register with the proximal gap 580 and the distal gap 582. When the peg 574 and the mirror-image peg (not shown) on the other side of the drilling guide 500 both engage their respective, proximal gaps 580, as shown in FIG. 21, the positioning member 514, when flush with the edge 204 of a door 200 will position the axis 542 a distance of 2⅜ inches from the edge 204 of the door 200, in accord with the standard discussed above. In contrast, when the peg 574 and the opposite peg on the other side of the drilling guide (not shown) both engage their respective, distal gaps 582, the positioning member 514, when flush with the edge 204 of a door 200 will position the axis 542 a distance of 2⅜ inches from the edge 204 of the door 200, in accord with the other standard discussed above, FIG. 21 also shows the upper flange spring 517 on the positioning member 514. FIG. 22 shows another perspective view of the drilling guide 500 of FIG. 18. FIG. 23 shows a top plan view of the drilling guide 500. The tabs 571 of the positioning member 514 engage the tracks 573 in the frame 512 to help the positioning member 514 toggle between the two positions.

Figure 24:
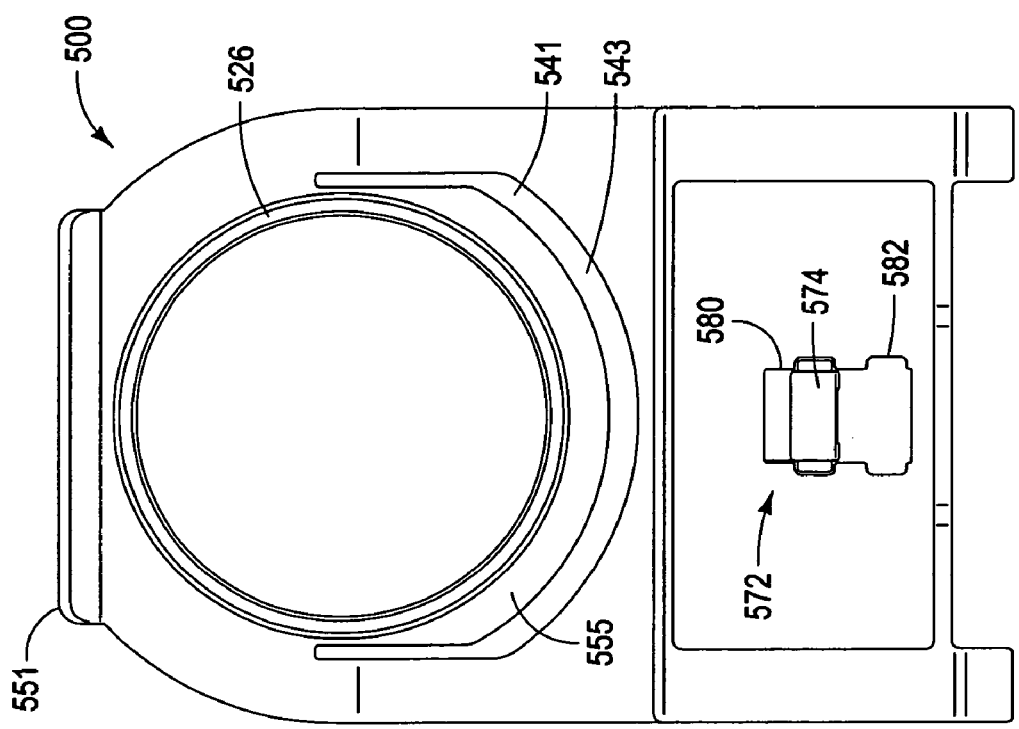
FIG. 24 shows a side plan view of the lockset drilling guide of FIG. 18.
Figure 25:
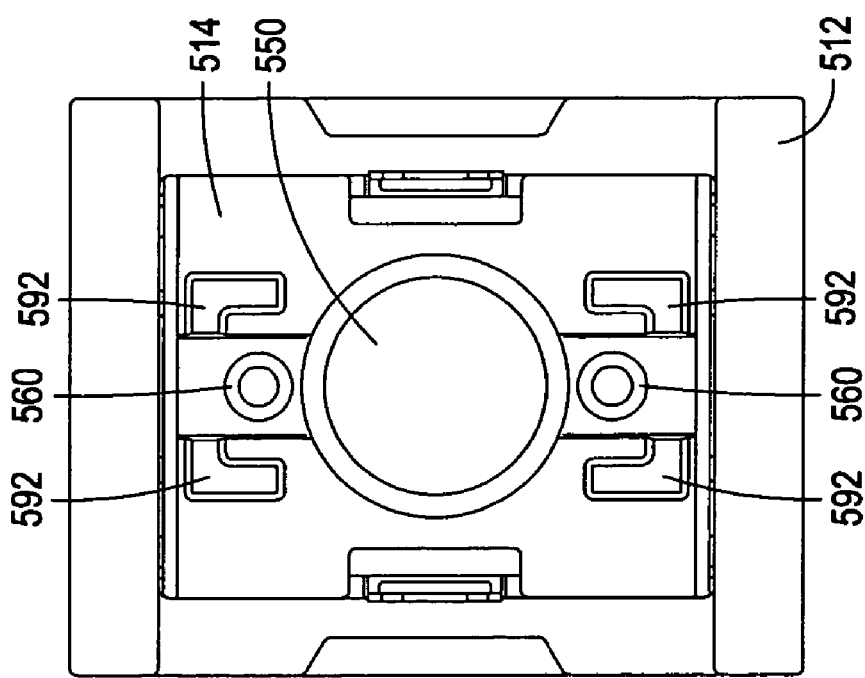
FIG. 25 shows a front plan view of the lockset drilling guide of FIG. 18.

FIG. 24 shows a side plan view of the drilling guide 500, and shows the peg 574 of the detent mechanism 572 engaging the proximal gap 580. The semicircular slit 543 and the rim 555 attached to the annular lip 555. FIG. 25 shows another plan view of the drilling guide 500. The positioning member 514 has latchplate stencil 592. When the drilling guide 500 is mounted on the door 200, the outlines for the latchplate may be drawn through the stencil 592 to ensure that the latchplate groove is positioned in proper relation to a hole drilled though the opening 550 and the rest of the installed lockset mechanism.

Figure 26:
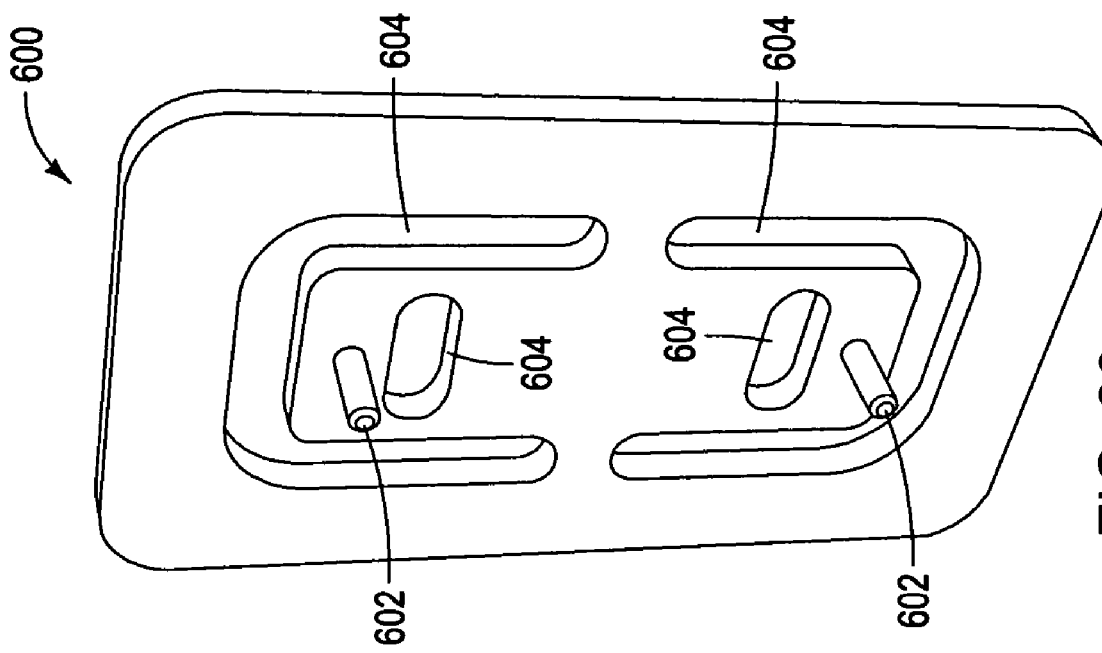
FIG. 26 shows a perspective view of a trim plate jig.

FIG. 26 shows a trim plate 600 for cutting or marking the groove for the latchplate. The trim plate 600 is preferably stamped out of metal, although can be made by any means known to those of skill in the art. Two pegs extend from a midsection of the trim plate 600 near the openings 604.

After the holes have been cut into the door 200, as described above, the drilling guide 500 is removed from the door 200. The trim plate 600 is attached to the edge 204 of the door 200 by inserting the two pegs 602 of the trim plate 600 into the screw holes drilled through openings 560 to attach the drilling guide 500. Alternatively, the two pegs 602 may be replaced with holes that can accommodate screws; two screws can be countersunk through such holes to attach the trim plate 600 to a door 200. Openings 604 in the trim plate expose portions of the door that are to be removed to accommodate the latchplate. The openings 604 can operate as a stencil so that the area for the groove can be marked with a pencil.

Figure 27:
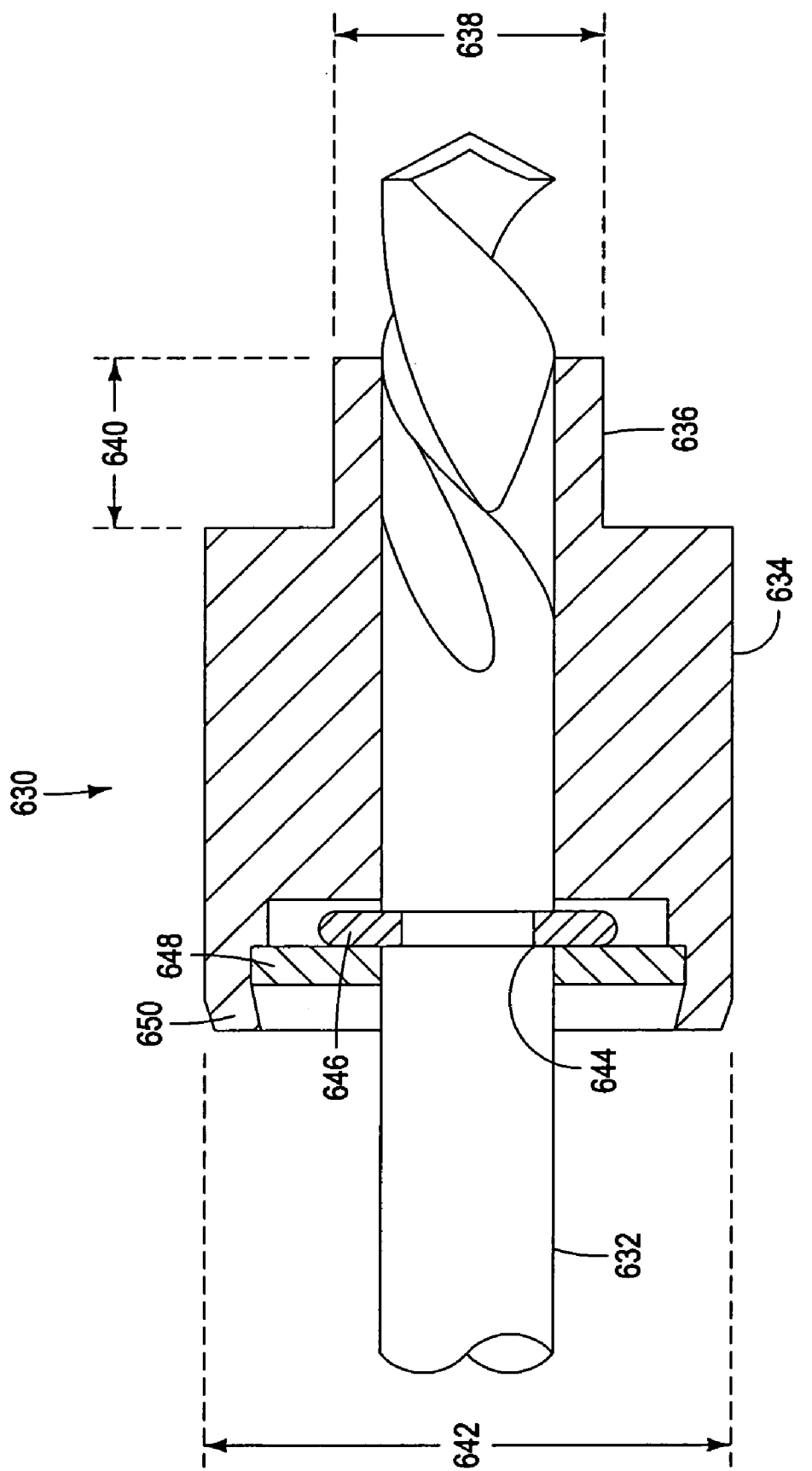
FIG. 27 shows a side cutaway view of the trim jig cutter.

The trim jig cutter 630 is shown in FIG. 27. The trim jig cutter described below can be used in conjunction with the trim plate 600 to remove a precise depth of material from the edge 204 of the door 200 exposed through the openings in the trim plate. The trim jig cutter has a drill bit 632, or any similar cutting device, such as a router. The drill bit 632 is surrounded by a bushing 634. The drill bit has a circumferential groove 644 cut into it, in which fits a C-clip 646 of a greater diameter than the drill bit 632. The attached C-clip 645 fits into the bushing 634. A washer 648 is placed over the C-clip 646 and a rim 650 around the bushing 634 is crimped over the washer 648 to capture the washer 648, thereby fixing the drill bit 632 in place.

The narrow diameter of the trim jig cutter 630 is approximately the width of the openings in the trim plate, or slightly smaller. The wider diameter 642 of the bushing 634 larger than the size of the trim plate openings. This allows the trim jig cutter maintain a set drilling depth, when inserted into an opening 604 of the trim plate 600. The annular lip 636 around the drill bit 632 prevents the drill bit 532 from wearing on the trim plate 600.

By using the trim jig cutter through all of the areas exposed through the openings 604, the outlines of the latchplate pocket have been created. The drilling guide 500 may be provided in a kit that further includes a trim jig for routing the edge 204 of the door 200 for the placement of a strikeplate of a lockset.

Of course, it should be understood that a wide range of changes and modifications could be made to the preferred embodiments described above. In particular, some of the specific measurements noted herein may be changed without departing from the invention. Thus, it is intended that the foregoing detailed description be regarded as illustrative rather than limiting. The scope of the invention is defined by the appended claims, and all devise that come within the meaning of the claims, either literally or by equivalence, are intended to be embraced therein.

The invention claimed is:

1. A lockset drilling guide comprising:
a frame comprising a first flange and a second flange, wherein said second flange is capable of flexing relative to said first flange;
at least a first opening and a second opening defined in said frame, said first opening positioned at approximately 90 degrees relative to said second opening; and
a positioning member mounted on said frame, wherein said positioning member is movable to at least two positions relative to said frame;
wherein said frame is configured for mounting on a door to facilitate the forming of holes in said door for the installation of a lockset.

2. The lockset drilling guide of claim 1, wherein said first opening is defined by a first cylindrical wall.

3. The lockset drilling guide of claim 2, wherein said second opening is defined by a second cylindrical wall.

4. The lockset drilling guide of claim 2, wherein said first cylindrical wall is partially bounded by a semi-circular gap.

5. The lockset drilling guide of claim 1, wherein said first flange is angled toward said second flange.

6. The lockset drilling guide of claim 1 further comprising a detent mechanism that is capable of maintaining said positioning member in one of said at least two positions relative to said frame.

7. The lockset drilling guide of claim 6, wherein said detent mechanism comprises a biased peg capable of engaging an opening in said frame.

8. The lockset drilling guide of claim 7, wherein said detent mechanism further comprises a second biased peg capable of engaging a second opening in said frame.

9. The lockset drilling guide of claim 6, wherein said at least two positions comprise:
a distal position that establishes an approximately 2¾-inch backset as measured from an edge of said door to a center axis of said first opening when said lockset drilling guide is mounted on said door; and
a proximal position that establishes an approximately 2⅜-inch backset as measured from an edge of said door to a center axis of said first opening when said lockset drilling guide is mounted on said door.

10. The lockset drilling guide of claim 1, wherein said at least two positions comprise:
a distal position that establishes an approximately 2¾-inch backset as measured from an edge of said door to a center axis of said first opening when said lockset drilling guide is mounted on said door; and
a proximal position that establishes an approximately 2⅜-inch backset as measured from an edge of said door to a center axis of said first opening when said lockset drilling guide is mounted on said door.

11. The lockset drilling guide of claim 1, wherein said positioning member further comprises at least two tabs and said frame further comprises at least two tracks and wherein said tabs are able to move along said tracks.

12. The lockset drilling guide of claim 1, further comprising at least two springs that face each other on an inside of said lockset drilling guide.

13. The lockset drilling guide of claim 12, wherein said springs are flange springs.

14. The lockset drilling guide of claim 13, wherein said flange springs extend from said positioning member.

15. The loekset drilling guide of claim 13, further comprising two additional flange springs that face each other on said inside of said lockset drilling guide.

16. The lockset drilling guide of claim 15, wherein said four flange springs extend from said positioning member.

17. The lockset drilling guide of claim 1, wherein said positioning member comprises a circular opening bounded by a cylindrical wall.

18. The lockset drilling guide of claim 1, wherein said first flange and said second flange each has an outwardly angled lip.

19. The lockset drilling guide of claim 1, wherein a distance between said first flange and said second flange along an axis that extends through said openings in said flanges is less than 1⅜ inches when in a relaxed state.

20. The lockset drilling guide of claim 19, wherein said first flange and said second flange are capable of flexing away from each other to a distance of at least 1¾ inch is measured along an axis that extends through said openings in said flanges.

21. The lockset drilling guide of claim 1, wherein said positioning member further comprises two openings capable of receiving fasteners.

22. The lockset drilling guide of claim 1, wherein said positioning member further comprises stencil openings for indicating an outline of a latchplate.

23. A lockset drilling guide kit comprising:
a lockset drilling guide comprising:
a frame comprising a first flange and a second flange, wherein said second flange is capable of flexing relative to said first flange;
at least a first opening and a second opening defined in said frame, said first opening positioned at approximately 90 degrees relative to said second opening; and
a positioning member mounted on said frame, wherein said positioning member is laterally movable to at least two positions relative to said flanges; and a first hole-boring device sized for insertion into at least one of said openings.

24. The lockset drilling guide kit of claim 23, further comprising a second hole-boring device.

25. The lockset drilling guide kit of claim 23, wherein said first hole-boring device is a first holesaw bit.

26. The lockset drilling guide kit of claim 24 wherein said first hole-boring device is a first holesaw bit and said second hole-boring device is a second holesaw bit having a smaller diameter than said first holesaw bit.

27. The lockset drilling guide kit of claim 24, further comprising a pilot drill bit for use with said first holesaw bit.

28. The lockset drilling guide kit of claim 23, wherein each of said flanges defines a circular opening and said positioning member defines a circular opening.

29. The lockset drilling guide kit of claim 28, wherein said lockset drilling guide further comprises a detent mechanism that is capable of maintaining said positioning member in one of said at least two positions relative to said frame.

30. The lockset drilling guide kit of claim 23, further comprising a trim plate having stencil openings.

31. The lockset drilling guide kit of claim 30, further comprising a trim jig cutter sized to enter said stencil openings a predetermined distance.

32. A method of forming a hole in a door for the placement of a lockset, said method comprising:
providing a lockset drilling guide comprising:
a frame comprising a first flange and a second flange;
at least a first opening defined in said frame; and
a positioning member mounted on said frame, wherein said positioning member is laterally movable to at least two positions relative to said flanges;
moving said positioning member to one of said at least two positions;
orienting said lockset drilling guide relative to said door;
mounting said lockset drilling guide to said door so that said first opening is positioned on said door at a predetermined location and inserting a pair of fasteners through a pair of through-going holes in said lockset drilling guide; and
inserting a drilling tool within said first opening and operating said tool to form a hole in said door substantially concentric with said first opening.

33. The method of claim 32, wherein said frame further comprises a second opening and said method further comprises inserting a drilling tool within said second opening and operating said tool to form a hole in said door substantially concentric with said second opening.

34. The method of claim 32, wherein said pair of through-going holes are located in said positioning member.

35. The method of claim 32, further comprising removing said frame from said door and mounting a door latchplate via openings on said door previously made by said fasteners.

36. A method of forming a hole in a door for the placement of a lockset, said method comprising:
providing a lockset drilling guide comprising:
a frame comprising a first flange and a second flange;
at least a first opening defined in said frame; and
a positioning member mounted on said frame, wherein said positioning member is laterally movable to at least two positions relative to said flanges;
moving said positioning member to one of said at least two positions;
orienting said lockset drilling guide relative to said door;
mounting said lockset drilling guide to said door so that said first opening is positioned on said door at a predetermined location and inserting at least one fastener through a through-going hole in said lockset drilling guide; and
inserting a drilling tool within said first opening and operating said tool to form a hole in said door substantially concentric with said first opening.

37. A lockset drilling guide comprising:
a frame comprising a first flange and a second flange, wherein said first flange and said second flange are capable of flexing relative to one another;
at least a first opening and a second opening defined in said frame, said first opening positioned at approximately 90 degrees relative to said second opening; and
a third opening defined in said frame, said third opening positioned so as to be aligned along a central axis with said first opening; and
a positioning member mounted on said frame, wherein said positioning member is movable substantially perpendicularly to said central axis to at least two positions relative to said frame;
wherein said frame is configured for mounting on a door to facilitate the forming of holes in said door for the installation of a lockset.

38. A method of forming a hole in a door for the placement of a lockset, said method comprising:
providing a lockset drilling guide comprising:
a frame comprising a first flange and a second flange;
said frame including a first flexible portion and a second flexible portion opposed to the first flexible portion wherein said first flexible portion and said second flexible portion are capable of flexing relative to one another to hold the frame on a door;
at least a first opening defined in said frame; and
a positioning member mounted on said frame, wherein said positioning member is laterally movable to at least two positions relative to said flanges;
moving said positioning member to one of said at least two positions;
orienting said lockset drilling guide relative to said door;
mounting said lockset drilling guide to said door using said first flexible portion and said second flexible portion so that said first opening is positioned on said door at a predetermined location; and
inserting a drilling tool within said first opening and operating said tool to form a hole in said door substantially concentric with said first opening.

39. A lockset drilling guide comprising:
a frame comprising a first flexible portion and a second flexible portion opposed to the first flexible portion, wherein said first flexible portion and the second flexible portion are capable of flexing relative to one another to hold the frame on a door;

at least a first opening and a second opening defined in said frame, said first opening positioned at approximately 90 degrees relative to said second opening; and
a positioning member mounted on said frame, wherein said positioning member is movable to at least two positions relative to said frame;
wherein said frame is configured for mounting on a door using the first flexible portion and the second flexible portion to facilitate the forming of holes in said door for the installation of a lockset.

* * * * *